United States Patent [19]
DePuy

[11] 3,725,769

[45] Apr. 3, 1973

[54] DIGITAL REGULATOR AND METHOD OF CURRENT REGULATION

[75] Inventor: Robert P. DePuy, Cherry Hill, N.J.

[73] Assignee: General Electric Company

[22] Filed: Jan. 10, 1972

[21] Appl. No.: 216,681

[52] U.S. Cl. ...................321/14, 321/25, 321/27 R
[51] Int. Cl. ............................................H02m 1/18
[58] Field of Search...................321/5, 14, 25, 26, 27

[56] References Cited

UNITED STATES PATENTS

| | | | |
|---|---|---|---|
| 2,243,572 | 5/1941 | Moyer et al. | 321/27 R |
| 2,845,591 | 7/1958 | Albrecht et al. | 321/27 |
| 2,891,212 | 6/1959 | Bingham | 321/25 X |
| 3,172,093 | 3/1965 | Diebold | 321/14 X |
| 3,205,423 | 9/1965 | Kanngiesser | 321/27 R X |
| 3,241,052 | 3/1966 | Day | 321/25 X |
| 3,270,271 | 8/1966 | Stuefen | 321/25 |
| 3,624,405 | 11/1971 | Bishop et al. | 321/25 X |
| 3,662,250 | 5/1972 | Piccone et al. | 321/27 R |

Primary Examiner—William M. Shoop, Jr.
Attorney—J. Wesley Haubner et al.

[57] ABSTRACT

A digital regulator for controlling the amount of current supplied to a load from parallel-connected rectifiers. If no rectifier is overloaded, the regulator maintains the magnitude of load current at a preselected level by either raising the output of the rectifier which is supplying the least current or by lowering the output of the rectifier which is supplying the most current. If, however, any rectifier becomes overloaded, the regulator switches to a mode of operation in which it allows the overloaded rectifier to operate in its overloaded state for a predetermined period of time, after which its current output is lowered. If the lowering of the current output of the overloaded rectifier causes the magnitude of load current to drop below the preselected level, the regulator will, after lowering the output of the overloaded rectifier, raise the output of the rectifier which has been continuously operating in range for the longest period of time.

13 Claims, 20 Drawing Figures

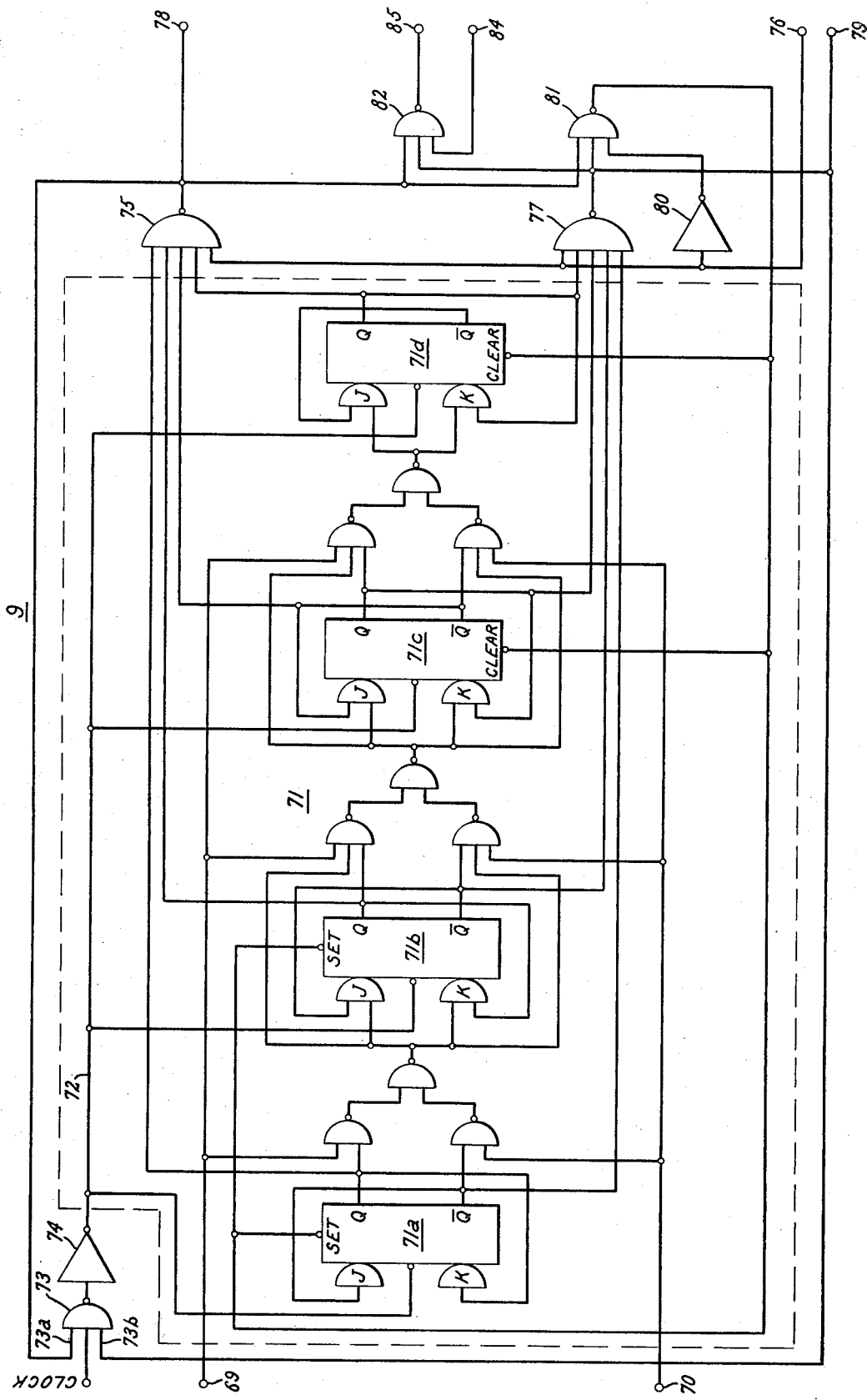

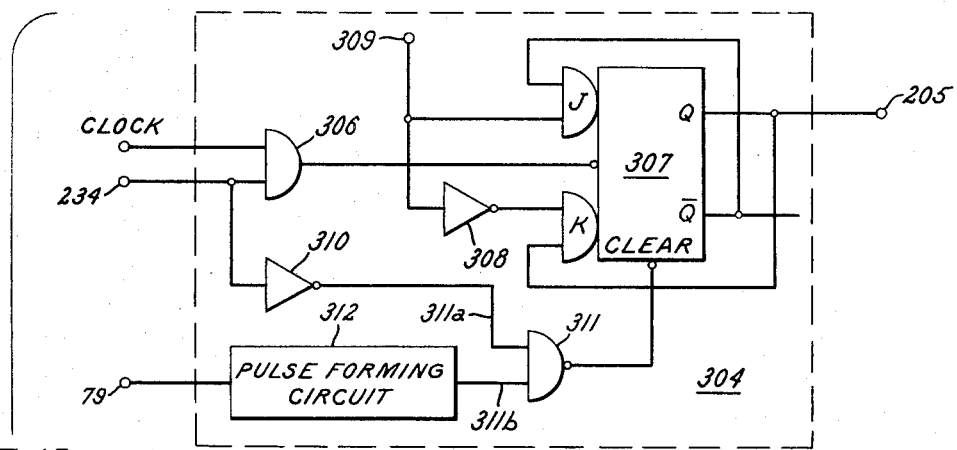
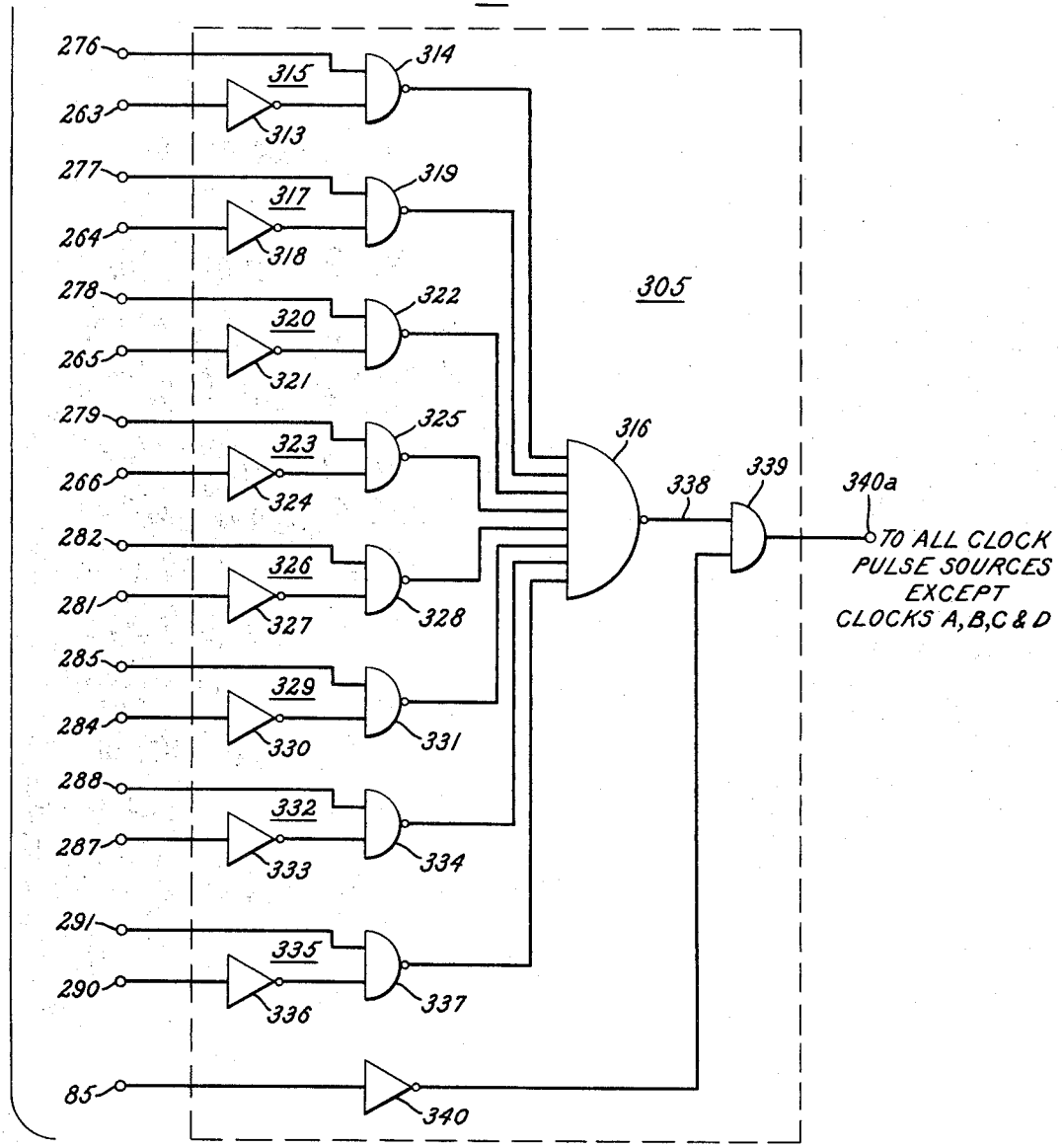
Fig. 16.

3,725,769

DIGITAL REGULATOR AND METHOD OF CURRENT REGULATION

BACKGROUND AND OBJECTS OF THE INVENTION

This invention relates generally to regulation systems for current supplies and more particularly to automatic regulators for use in parallel-rectifier, high-current supply systems. The following art now known to applicant is indicative of prior art approaches relevant to this area of technology: U.S. Pat. Nos. 1,849,518 (Gay); 2,243,572 (Moyer et al); 2,845,591 (Albrecht et al); 3,229,187 (Jensen); and 3,270,271 (Stuefen).

In electrical systems requiring the production of high levels of direct current, e.g., the electrolysis of brine into chlorine, several rectifier groups including associated transformers may be connected in parallel with one another to supply current to the load. In order to ensure that the level of current which is supplied to the load is maintained at a preselected level, regulation equipment is commonly coupled to the rectifiers. Such equipment is operative for raising the output current of a rectifier if the load current is sensed as being below a preselected level and for lowering the output current of a rectifier if the load current is sensed as being above a preselected level.

Unless each of the rectifiers of the supply system have identically matched characteristics and are operated at the same output voltages, during parallel operation there will probably be differences in the amount of current that each provides to the load. In some situations the variation in output voltages among the rectifier groups can result in a rectifier group providing substantially more than full rated current (e.g., 110 percent).

Accordingly, when parallel rectifier current supply systems are designed it is a common practice to provide each rectifier with a rectifier transformer having the capability of continuous operation at levels wherein its associated rectifier is supplying full rated current plus the increment of current which is attributable to the voltage difference among the rectifier groups in the system. Such transformers can be rather expensive.

It is the main object of my invention to provide a regulation system for a parallel rectifier, high current supply system which enables the utilization of smaller rectifier supply transformers than with prior art systems.

It is a further object of my invention to provide a digital regulation system for parallel-rectifier, high current supply systems.

It is yet a further object of my invention to provide an improved method of regulating parallel rectifier units supplying high current to a load.

It is yet a further object of my invention to provide a digital regulation system which has plural modes of operation, one mode being automatically utilized whenever at least one rectifier group is providing more than full rated current (i.e., is overloaded) to ensure that heating of the rectifier supply transformers is kept to a minimum.

SUMMARY OF THE INVENTION

In a parallel-rectifier, high-current supply system I provide an automatic regulator which monitors and controls the magnitude of current supplied to a load. If the magnitude of load current is above a preselected level and all units are operating at or below full rated current the regulator causes the rectifier which is supplying the most current to decrease its output. Conversely, if the magnitude of load current is below a preselected level the regulator causes the rectifier which is supplying the least current to increase its output.

If any rectifier becomes overloaded, i.e., provides more than full rated current, the regulator automatically switches to a mode of operation in which the overloaded rectifiers(s) is allowed to operate in the overloaded condition for a predetermined period of time. Upon the termination of that period of time the regulator automatically decreases the output of the rectifier which has been overloaded for the longest immediately preceding period of time. If, in response to the decreasing of the output of the overloaded rectifier, the load current drops below the preselected level, the regulator automatically raises the output of the rectifier which has been operating in range (i.e., at or below full rated current) continuously for the longest immediately preceding period of time.

The time period during which a rectifier is allowed to operate in an overloaded condition is predetermined and is sufficiently short so as to minimize excess heating of the rectifier's supply transformer (i.e., the period is short compared to the thermal time constant of the rectifiers' supply transformer).

When all of the system's rectifiers are again operating in range and the regulator determines that the load current is above the preselected level the regulator automatically switches back to the mode of operation wherein the maintenance of the preselected magnitude of load current is effectuated by either raising the output of the rectifier which is supplying the least current or by lowering the rectifier which is supplying the most current.

DESCRIPTION OF THE DRAWINGS

This invention will be better understood and its various objects and advantages will be more fully appreciated from the following description taken in conjunction with the accompanying drawings in which:

FIG. 5 is a schematic diagram of the Up-Down Counter 9 shown in FIG. 2;

FIG. 16 is a schematic diagram of the Overload Auxiliary Control Circuit 23 shown in FIG. 2;

DETAILED DESCRIPTION OF THE PREFERRED EMBODIMENT

Figure 1:
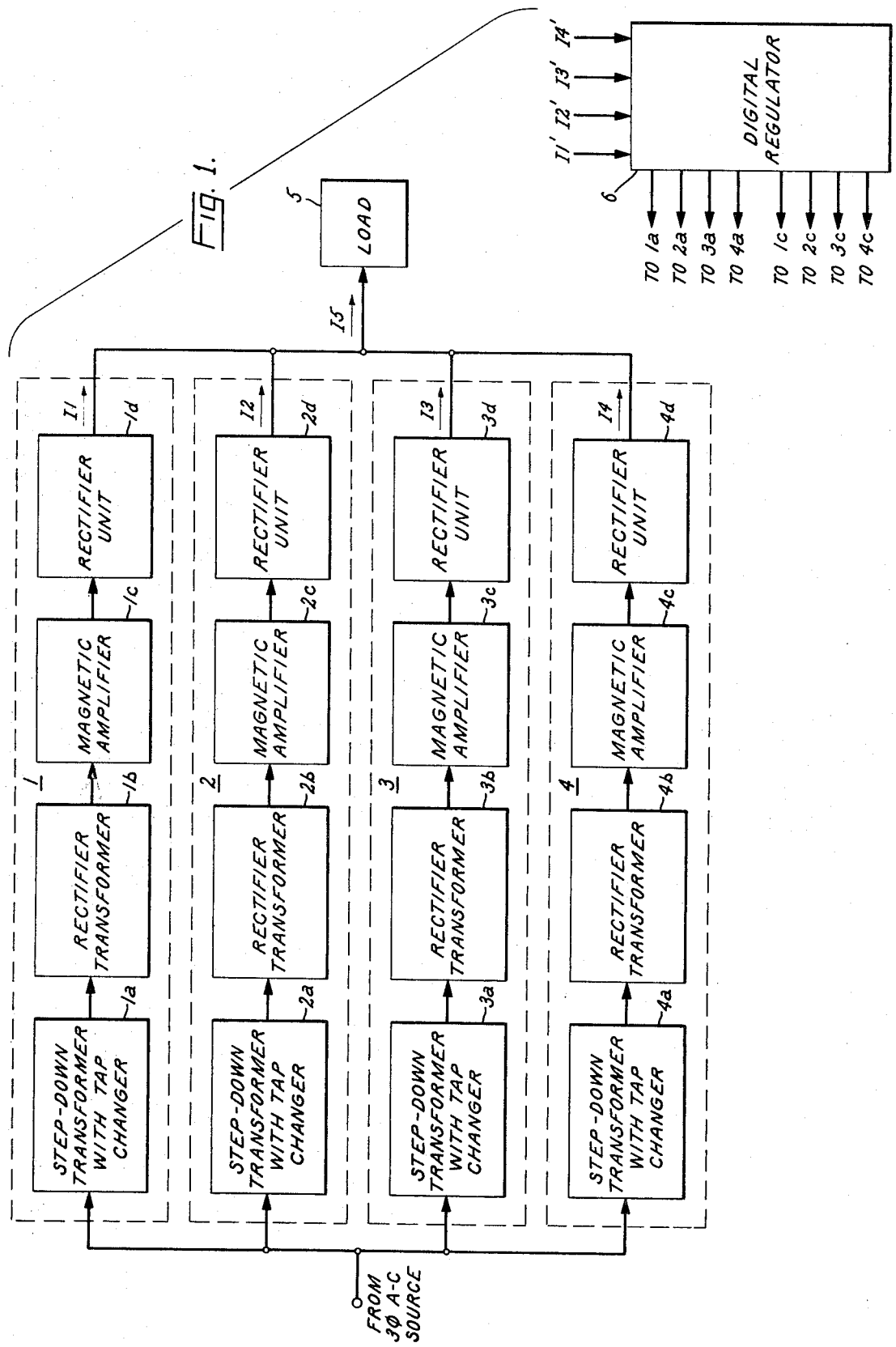
FIG. 1 is a functional block diagram of a plural rectifier current supply system including my digital regulator.

FIG. 1 is a functional block diagram of a system for supplying high levels of current to a load. As can be seen four rectifier groups, i.e. 1, 2, 3 and 4, are connected in parallel with one another between a three phase source of alternating voltage and a direct current load 5.

Each rectifier group is adapted for stepping down the voltage from the three phase source and converting it to a unidirectional or D-C current and for supplying that current to the load 5. To that end each rectifier group includes a step-down transformer having associated therewith a tap changer, a rectifier transformer, a magnetic amplifier and a rectifier unit. For example, group 1 includes step-down transformer 1a, rectifier transformer 1b, magnetic amplifier 1c, and rectifier unit 1d. In a similar manner group 2 includes step-down transformer 2a, rectifier transformer 2b, magnetic amplifier 2c and rectifier unit 2d. Group 3 includes step-down transformer 3a, rectifier transformer 3b, magnetic amplifier 3c and rectifier unit 3d, and group 4 includes step-down transformer 4a, rectifier transformer 4b, magnetic amplifier 4c and rectifier unit 4d.

The magnitude of the portion of total load current that each rectifier unit supplies is a function of the voltage applied thereto. Accordingly, a change in the magnitude of the output current which is provided by any individual unit can be effectuated by either raising or lowering the voltage applied to that unit.

The raising or the lowering of the voltage applied to a rectifier unit is accomplished digitally by changing the state of the magnetic amplifier and, if needed, by altering the tap setting of the step-down transformer tap changer. To that end the tap changer includes sufficient settings or steps to cover the voltage range necessary to regulate a unit's output current, with each step effecting a predetermined incremental (or decremental) change in the average magnitude of the rectifier voltage. The magnetic amplifier is so constructed and arranged that in one state (referred to hereinafter as saturated) it has negligible effect, while in its other state (unsaturated) it stands off enough voltage to cause a reduction in the average magnitude of the rectifier voltage approximately equal to one-half of the aforesaid predetermined change. The half step thus afforded by the magnetic amplifier provides at relatively low cost the resolution necessary for current regulation accuracy.

The manner in which the tap changer and the magnetic amplifier control the voltage on their associated rectifier unit can be best understood from the following example. In order to raise the voltage applied to a rectifier unit the equivalent of one half of a tap setting (which is the smallest incremental voltage change possible), if the magnetic amplifier is unsaturated the change is effectuated by merely saturating the magnetic amplifier while leaving the tap on the step-down transformer tap changer at its existing setting. The saturation of the magnetic amplifier will result in raising the average voltage of the rectifier a half step to the level determined by that particular tap setting.

If the magnetic amplifier is saturated, a one-half step raise is effectuated by desaturating the amplifier and at the same time raising the tap setting on the tap changer by one full step. The net effect of the one step rise in voltage (resulting from the changed tap setting) and the half step drop in voltage (resulting from the desaturation of the magnetic amplifier) results in a one-half step rise in the voltage applied to the rectifier unit.

As should be apparent, the voltage applied to a rectifier unit can be lowered by one half of a step by the opposite procedure which is utilized to effect the one half step increase.

As can be seen in FIG. 1 the unidirectional output current of unit 1 is denoted as I1, the unidirectional output current of unit 2 is denoted as I2, the unidirectional output current of unit 3 is denoted as I3 and the unidirectional output current of unit 4 is denoted as I4. The sum of currents I1, I2, I3 and I4 is denoted as I5 and is delivered to the load 5.

It should be pointed out at this juncture that each of the rectifier units may include one or a plurality of parallel connected rectifiers depending upon the magnitude of output current desired therefrom.

The alteration of the tap changer's position and the magnetic amplifier's state is accomplished automatically by the digital regulator of my invention. In so doing the regulator is able to regulate the amount of current supplied to the load to either maintain it at a preselected level or to raise or lower it to another preselected level.

The digital regulator of my invention is shown as a functional block 6 in FIG. 1.

My regulator receives its inputs I1', I2', I3' and I4' which are currents proportional to the group output currents I1, I2, I3 and I4, respectively. The output of the digital regulator consists of signals which are utilized to change the tap changer setting for each group's step-down transformer tap changer and to change the state of each group's magnetic amplifier.

The regulator has two modes of automatic operation, one mode is what I choose to call "current basis" operation and the other mode is what I choose to call "sequence basis" operation.

The controller operates on a "current basis" whenever all rectifier groups are "in range" (i.e., whenever no rectifier group is providing more than full rated current or is overloading its associated rectifier transformer).

"Current basis" operation entails determining if the magnitude of load current is at a preselected level and if not, for altering the voltage on selected rectifiers to bring the load current to that level. To that end, if the regulator 6 determines that the load current is below the preselected level, the voltage on the rectifier unit which is supplying the least current will be raised automatically in order to increase its output current and to bring the load current up to the desired level. If the regulator determines that the load current is above the preselected level, the voltage on the rectifier unit which is supplying the most current will be lowered automatically in order to decrease its output current and bring the load current down to the desired level.

The regulator operates on a "sequence basis" whenever any rectifier group is providing more than full rated current. "Sequence basis" operation also entails maintaining the load current at a preselected level although the manner which such regulation is accomplished differs from "current basis" operation. To that end the regulator 6 determines the order in which the rectifier units began and have continuously remained "in range" (i.e., it determines which unit has been continuously in range the longest period of time, which unit has been continuously in range the next longest period of time, and so on) and also determines the order in which the rectifier units began and have continuously remained in an overloaded condition (i.e., it determines which unit has been continuously overloaded the longest period of time, which unit, if any, has been overloaded the next longest period of time, and so on).

After a preselected period of time the voltage on the rectifier unit which has been overloaded the longest period of time is decreased, thereby allowing its associated rectifier transformer to cool down. If the controller determines that the magnitude of load current flowing is below the preselected level (due to the lowering of the voltage on the overloaded unit) it automatically raises the voltage on the unit which has been "in range" continuously for the longest immediately preceding period of time. After another similar length period of time the voltage on the overloaded rectifier unit is decreased, thereby allowing its associated transformer to cool down. If the regulator then determines that the magnitude of load current is below the predetermined level (e.g., due to the lowering of the voltage on the overloaded unit) it automatically raises the voltage on the unit which has, at that time, been "in range" continuously for the longest immediately preceding period of time.

Sequence basis operation continues so long as any unit remains overloaded. As soon as conditions are such that no unit is overloaded but the magnitude of load current is above the preselected level the regulator automatically switches back to "current basis" operation.

Figure 2:
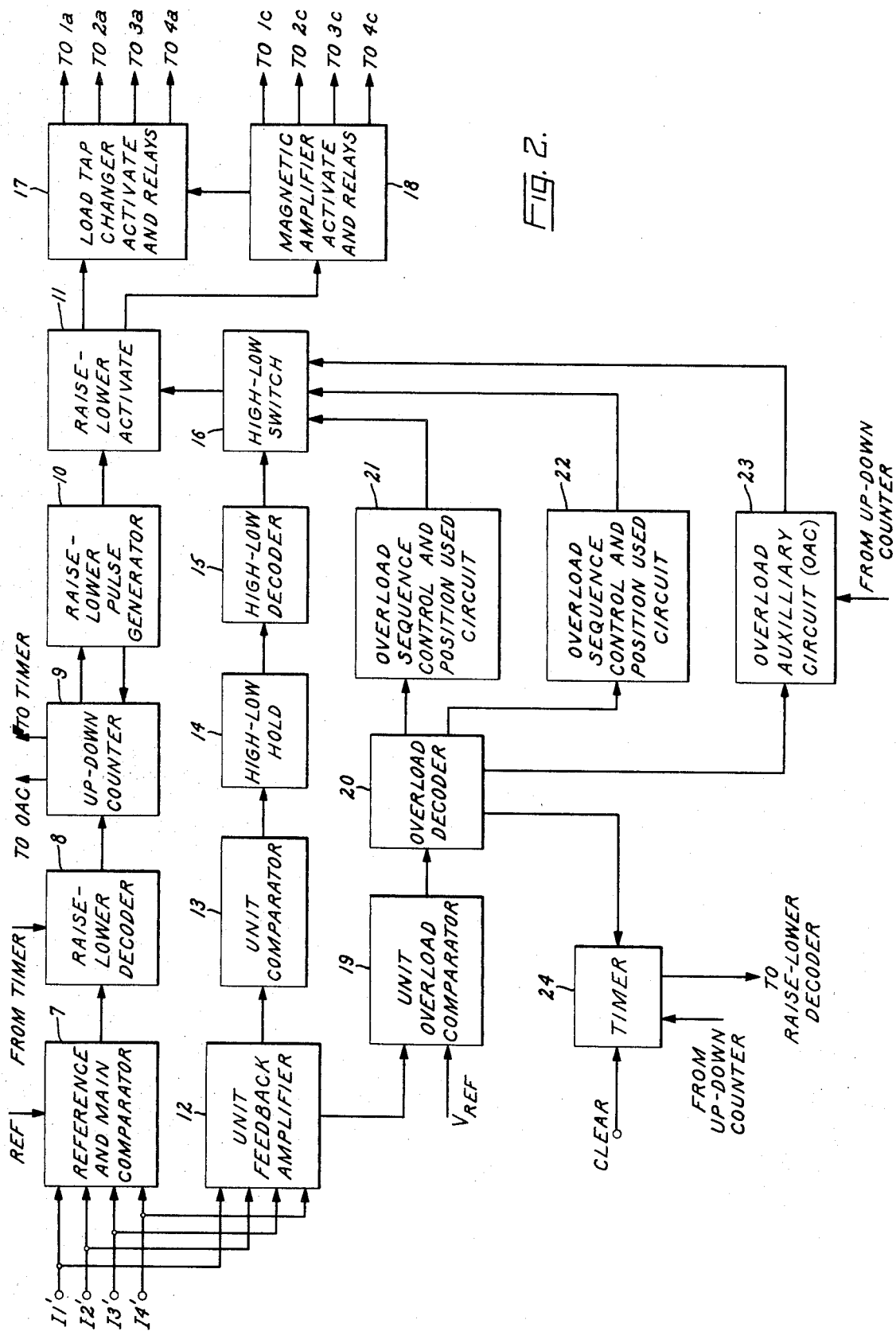
FIG. 2 is a functional block diagram of my digital regulator.

The portion of the digital regulator which effectuates "current basis" operation can be seen in the functional block diagram of FIG. 2 and includes a Reference and Main Comparator Circuit 7, a Raise-Lower Decoder Circuit 8, an Up-Down Counter Circuit 9, a Raise-Lower Pulse Circuit 10, a Raise-Lower Activate Circuit 11, a Unit Feed-back Amplifier 12, a Unit Comparator Circuit 13, a High-Low Hold Circuit 14, a High-Low Decoder Circuit 15, a High-Low Switch 16, a Tap Changer Activate and Relay Circuit 17 and a Magnetic Amplifier Activate and Relay Circuit 18. Each of these circuits is provided with suitable clock pulses from pulse generators, not shown, to ensure that proper operation of the regulator ensues.

The reference in main comparator circuit 7 sums the plurality of current signals I1', I2'', I3' and I4' which are proportional to currents I1, I2, I3 and I4, respectively and are provided by current transducing means, not shown. The sum of signals I1', I2', I3' and I4' is denoted as I5' and is proportional to the magnitude of load current I5. The sum current signal I5' is compared in the comparator 7 to a preestablished dead-band reference voltage (i.e., a voltage band bounded by an upper limit voltage and by a lower limit voltage). The upper limit of the comparator's dead-band reference voltage is adjustable and defines the maximum level of load current which the regulator will allow to flow before it lowers the voltage on any rectifier unit. The lower limit of the dead-band voltage is also adjustable and defines the minimum level of load current that the regulator will allow to flow before it raises the voltage on any rectifier unit.

If the sum signal I5' is lower than the lower deadband limit, a "raise" signal is provided by the circuit 7. This raise signal is provided via two conductors and consists of a binary "0" on each conductor. If the sum signal is higher than the upper dead-band limit a "lower" signal is provided by the circuit 7. The "lower" signal consists of a binary "1" on each conductor. If the sum signal is within the dead-band (indicating that the magnitude of load current is at the preselected level) the output of the comparator circuit consists of a binary "1" signal on one output wire and a binary "0" signal on the other output wire. These signals indicate that no change is required.

The output signals from the comparator 7 are decoded by the Raise-Lower Decoder 8.

The output of the Raise-Lower Decoder 8 is provided via two wires, one wire being a "raise" wire and the other wire being a "lower" wire. If the comparator output is a "0" and "0" the decoder 8 provides a binary "1" signal at its "raise" output, if the comparator output is a "1" and "1" the decoder provides a binary "1" signal at its "lower" output. If the output of the comparator is a "1" and "0" the decoder doesn't provide a binary "1" at either of its outputs. The signal from the decoder is therefore either a "raise" or a "lower" or a "no change" signal and is supplied as an input to the Up-Down Counter Circuit 9.

The Up-Down Counter Circuit is provided to delay a change in the voltage on any rectifier unit, if such a change is desired, until any transients which may have arisen in the system will have subsided. To that end the counter is designed to count the number of clock pulses provided to it, up to a prescribed time-out point in response to the continuance of a "raise" signal from the decoder 8 and to count the number of clock pulses provided to it, down to a prescribed time-out point in response to the continuance of a "lower" signal therefrom. If in counting up to the upper time-out point the "raise" signal from the decoder terminates before the counter reaches that point and is replaced by a "lower" signal, the counter will begin counting down from the point it reached in counting up.

Upon reaching the upper time-out point (in response to a sustained "raise" signal) the counter provides a "raise enable" signal at one of its output terminals. Upon reaching the lower time-out point (in response to a sustained "lower" signal) the counter provides a "lower enable" signal at another of its output terminals. Any time the counter reaches a time-out point its clocking pulses are suppressed.

The "raise enable" or "lower enable" signals are provided as inputs to the Raise-Lower Pulse Generator 10. This circuit is operative for generating a "raise" pulse in response to the "raise enable" signal or a "lower" pulse in response to the "lower enable" signal. To that end the generator includes a clocked counter which terminates the raise or lower enable signal after a preselected short period of time to produce a raise or lower pulse. The counter also provides a signal to reset the Up-Down Counter Circuit 9 upon reaching a preselected point in its count.

The raise or lower pulse from the generator 10 is provided as one input to the Raise-Lower Activate Circuit 11. This input carries the information as to whether or not the voltage on any rectifier unit needs to be raised or lowered to achieve the desired level of load current.

The Raise-Lower Activate Circuit 11 also receives the second input, which carries information as to which rectifier unit is low (i.e., needs to be raised next in the event that a raise is required), and which unit is high (i.e., needs to be lowered next in the event that a lower is required). Such information is provided in the following manner. The unit feedback amplifier 12 takes the four currents I1', I2', I3' and I4' and converts each into a pair of complementary voltages proportional to the magnitude of current provided by its associated rectifier unit. For example, current I1', which is proportional to the current output of rectifier unit 1d, is converted into complementary voltages +V1 and −V1, each of which is proportional to the magnitude of the output current of the rectifier unit 1d. Similarly provided complementary voltages +V2 and −V2 are each proportional to the output of rectifier unit 2d, complementary voltages +V3 and −V3 are each proportional to the output of rectifier unit 3d and complementary voltages +V4 and −V4 are each proportional to the output of rectifier unit 4d.

The complementary voltages are provided as inputs to the Unit Comparator Circuit 13. This circuit includes six subcircuits each of which compares the positive complementary voltage of one unit to the negative complementary voltage of another unit in order to determine which is of greater absolute magnitude. The output of all rectifier units are thus compared to one another in the unit comparator and signals indicating the relative level of the rectifier units output currents are provided at its output, i.e., the comparator provides six output signals, one comparing the current outputs of units 1d and 2d, another comparing the outputs of units 1d and 3d, a third comparing the outputs of units 1d and 4d, a fourth comparing the outputs of units 2d and 3d, a fifth comparing the outputs of units 2d and 4d and a sixth comparing the outputs of units 3d and 4d.

The six comparison signals are provided as inputs to the High-Low Hold Circuit 14. This circuit includes clocked flip-flops adapted for storing the unit comparison information and for providing it at their outputs. The output of the High-Low Hold Circuit is provided as an input to a High-Low Decoder Circuit 15 which decodes the comparison information.

The output of decoder 15 contains binary signals indicating which unit is providing the most current to the load and which unit is providing the least current thereto.

The decoder's binary output signals are provided as one input, called the "current basis" input, to the High-Low Switch 16. This switch includes circuitry operative for enabling the binary output signals from the decoder 15 to pass to the second input of the Raise-Lower Activate Circuit 11 if the regulator 6 is operating on a "current basis".

If any unit becomes overloaded, such that the regulator begins operating on a "sequence basis", a control signal indicating this fact is provided to the switch 16 to disable it from passing the decoder 15 binary signals to the activate circuit 11 and to enable it to pass "sequence basis" binary signals to the second input of the activate circuit.

Assuming that no units are overloaded and that the Pulse Generator Circuit 10 is providing either a "raise" or "lower" pulse, the binary output signals of the decoder 15 and the "raise" or "lower" pulse are combined in the Raise-Lower Activate Circuit 11.

A "raise" pulse coupled with a signal indicating that a particular unit is providing the least current to the load is combined in activate circuit 11 to provide an output signal indicating that such a unit is to have its voltage raised. Similarly, a "lower" pulse coupled with a signal indicating that a particular unit is providing the most current is combined in the activator circuit to provide an output signal indicating that such a unit is to have its voltage lowered.

The output signals of the Raise-Lower Activate Circuit 11 are provided as inputs to the Magnetic Amplifier Activate and Relay Circuit 18 and to the Tap Changer Activate and Relay Circuit 17.

Any time that a voltage change is to be made (i.e., any time that raise-lower activate circuit 11 provides output signals) the magnetic amplifier activate 18 is operated. This action results in either saturating or desaturating the magnetic amplifier for the unit to be changed depending on its immediately past state. The tap changer activate 17 is operated in response to the output of the Raise-Lower Activate Circuit 11 as well as the Magnetic Amplifier Activate and Relay Circuit 18. To that end assuming that unit 1d is to be raised and that its magnetic amplifier 1c is in its saturated state, upon the coincidence of a "raise" pulse and a binary signal indicating that unit 1d is low, the Raise-Lower Activate circuit provides an output signal to both the Magnetic Amplifier Activate and the Tap Changer Activate circuits. This output signal effectuates the desaturation of the magnetic amplifier 1c via the Magnetic Amplifier Activate circuit and at the same time causes the tap changer to be raised one step via the Tap Changer Activate circuit. The effect of the desaturation of the magnetic amplifier 1c and a one step rise in the tap setting of the tap changer 1a results in a one-half step rise in the voltage on the rectifier unit 1d. If the magnetic amplifier 1c has been unsaturated, upon the coincidence of the "raise" pulse and a signal indicating that unit 1d is low, the output signal from the Raise-Lower Activate 11 would cause the magnetic amplifier 1c to saturate but would not result in a change in the tap setting of the tap changer 1a. The saturation of magnetic amplifier 1c coupled with the maintenance of the tap setting of the tap changer 1a results in a one-half step raise in the voltage on the rectifier unit 1d.

The portion of my digital regulator which effectuates "sequence basis" operation can be seen in the functional block diagram of FIG. 2 and includes the Unit-Feedback Amplifier 12, a Unit Overload Comparator 19, an Overload Decoder 20, an Overload Sequence Control and Position Used Circuit 21, an Overload Sequence Control and Position Used Circuit 22, an Overload Auxiliary Circuit 23, a Timer 24, the High-Low Switch 16, the Reference and Main Comparator 7, the Raise-Lower Decoder 8, the Up-Down Counter 9, the Raise-Lower Pulse Circuit 10, the Raise-Lower Activate Circuit 11, the Tap Changer Activate and Relay Circuit 17 and the Magnetic Amplifier Activate and Relay Circuit 18.

Each of the positive complementary voltages, +V1, +V2, +V3 and +V4, from the Unit Feed Back Amplifier 12 are provided as inputs to the Unit Overload Comparator Circuit 19. This circuit compares those voltages to a reference voltage. The reference voltage is equivalent to the maximum current output which a rectifier unit may produce without overloading its associated rectifier transformer. The output signals from the comparator 19 are provided as inputs to the Overload Decoder Circuit 20. This circuit decodes the input information and provides a pair of binary output signals indicating if at least one rectifier unit is overloaded. It also provides a pair of binary output signals indicating which, if any, rectifier units are overloaded. The output signals carrying this information are provided as inputs into two identical circuits, namely, the Overload Sequence Control and Position Used Circuits 21 and 22.

Circuit 21 is adapted for storing information relating to "in range" operation of the rectifier units, and circuit 22 is adapted for storing information relating to "overload" operation of the rectifier units. Each of these circuits includes four shift registers. The first shift register in circuit 21 is adapted to store information regarding the order that rectifier unit 1d commenced "in range" operation relative to units 2d, 3d and 4d. The second shift register in circuit 21 stores information as to the order that rectifier unit 2d commenced "in range" operation relative to rectifier units 1d, 3d and 4d. In a similar manner the third shift register in circuit 21 stores the information as to the order that rectifier unit 3d commenced "in range" operation relative to rectifier units 1d, 2d and 4d, and the fourth shift register in circuit 21 stores the information as to the order that rectifier unit 4d commenced "in range" operation relative to rectifier units 1d, 2d, and 3d.

Each shift register includes three clocked flip-flops which are interconnected with logic circuitry adapted to disable information from being clocked into any position (i.e., flip-flop) in any register if that position is filled in any other register. For example, if the first position in the shift register of circuit 21 associated with rectifier unit 1d is filled, the first position in the shift registers associated with units 2d, 3d and 4d cannot fill until that position in register 1 is empty. Since there are only three positions in each register, the register of the last unit to enter "in range" operation will be empty.

The control circuit 21 provides an output signal which is taken off the first position flip-flop of each shift register. This signal indicates which unit has been operating "in range" continuously for the longest immediately preceding period of time. This output signal is utilized if any unit becomes overloaded.

The Overload Sequence Control and Position Used Circuit 22 is constructed and arranged in a similar manner as circuit 21 and is adapted for storing information regarding the order that the rectifier units become overloaded. To that end if any rectifier unit(s) becomes overloaded this circuit 22 provides an output signal indicating which rectifier has been continuously overloaded for the longest immediately preceding period of time. This signal is taken off the position 1 flip-flop in each shift register.

The shift registers in circuit 21 are arranged to be cleared in the event that the rectifier unit which they are associated with becomes overloaded. In a similar manner the shift registers of circuit 22 are arranged to be cleared in the event that the unit which they are associated with begins "in range" operation.

Assuming that no units are overloaded and that the shift registers in circuits 21 and 22 have been cleared, the shift registers in circuit 22 will remain cleared while the shift registers in circuit 21 will begin storing information regarding the order that units 1d, 2d, 3d and 4d begin "in range" operation. Assuming that the rectifier units began "in range" operation in numerical order, i.e., unit 1d first, unit 2d second, unit 3d third, and unit 4d last, the shift registers of circuit 21 will be filled in the following manner:

The first position of the first shift register will be filled, the second position of the second shift register will then be filled, the third position of the third shift register will then be filled, and all positions of the fourth shift register will be empty.

Since the output of the overload sequence circuit 21 is provided from the first position of each shift register and since only the first shift register has its first position filled, the output signal from circuit 21 will be provided from the first shift register. This signal indicates that rectifier unit 1d has been in range continuously for the longest and immediately preceding period of time.

The output of the control circuit 21 is supplied as one input, called the "sequence basis input" to the High-Low Switch 16 and the output of the control circuit 22 is supplied as a second "sequence basis input" thereto. Neither of the two "sequence basis inputs" to the switch 16 are utilized for regulating the load current if all of the rectifiers are "in range." In fact when no rectifier is overloaded there will be no output signal from the circuit 22.

As was previously noted when all rectifiers are operating in range the High-Low Switch 16 allows the passage of the "current basis input" signals from the High-Low Decoder 15 to the Raise-Lower Activate Circuit 11. If, however, any rectifier unit becomes overloaded, an output signal indicative of such a condition is produced by the Overload Decoder 20 and provided to the Overload Auxiliary Circuit 23.

The Overload Auxiliary Circuit has several functions, one of which being: in response to receipt of a binary signal from the decoder 20 (indicating that at least one rectifier unit is overloaded) it provides a binary signal to the High-Low Switch 16 to cause the switch to block the passage of "current basis input" signals while enabling the passage of "sequence basis input" signals to the Raise-Lower Activate Circuit 11.

At the same time another binary signal from the Overload Decoder 20 (indicating that at least one rectifier unit is overloaded) is supplied to the Timer Circuit 24. The timer circuit includes clocked counters which are interconnected and adapted to count approximately one hour of clock pulses whereupon a binary "lower" signal is produced and provided as an input to the Raise-Lower Decoder 8.

Assuming that rectifier unit 3d, having been the next to the last rectifier unit to commence "in range" operation suddenly becomes overloaded. The regulator will operate as follows: the unit overload comparator will compare the +V3 voltage to the reference voltage and finding that the +V3 voltage is greater will supply a binary signal indicating this fact to the Overload Decoder 20. The overload decoder will decode this information and provide output signals indicating that unit 3d is overloaded. One of such signals is provided to Overload Sequence Control circuit 21 and the other is provided to Overload Sequence Control circuit 22. At the same time the decoder will also produce a binary output signal indicating that at least one unit is overloaded. This latter signal is provided as an input to the Timer 24. Upon receipt of that signal the timer begins counting clock pulses. In the meantime the Overload Sequence Control and Position Used Circuit 21 (which had previously established that the rectifier unit 1d has been operating "in range" continuously for the longest immediately preceding period of time) provides a signal indicating this fact at its output. Upon receipt of a binary signal indicating that rectifier unit 3d is overloaded, the third shift register in the overload sequence control circuit 21 (i.e., the shift register associated with rectifier unit 3d) is cleared, whereupon the third position of the fourth shift register therein fills. The filling of the third position in that shift register indicates that as of that time rectifier unit 4d has been operating "in range" for the third longest period of time. At essentially the same time and in response to another signal from the Overload Decoder (indicating that rectifier unit 3d is overloaded) the first position in the third shift register of the Overload Sequence Control and Position Used Circuit 22 is filled.

Accordingly, one output signal from control circuit 21 will be a binary signal indicating that rectifier unit 1d has been operating "in range" continuously for the longest immediately preceding period of time and one output signal from control circuit 22 will be a binary signal indicating that rectifier unit 3d has been overloaded for the longest immediately preceding period of time.

At essentially the same time that the Overload Decoder 20 provides a signal to start the one hour timer 24, it also provides a signal to the Overload Auxiliary Circuit 23 indicating that a rectifier unit is overloaded. In response to that signal the auxiliary circuit provides a signal to the High-Low Switch 16 to cause it to switch to its state wherein it blocks any "current basis input" signals from passing to the Raise-Lower Activate Circuit 11 while enabling the passage of any "-sequence basis input" signals thereto. Accordingly, the raise-lower activate circuit will receive as inputs, binary signals indicating that rectifier 1d has been operating "in range" continuously for the longest immediately preceding period of time and that rectifier unit 3d has been overloaded for the longest immediately preceding period of time.

After counting clock pulses for approximately 1 hour, the timer 24 provides a "lower" signal to the Raise-Lower decoder. This signal is decoded and supplied to the Up-Down Counter Circuit 9. In response to that signal the counter circuit 9 will count down to its lower time-out point at which time it will provide a "lower" signal to the Raise-Lower Pulse Generator 10. In response to the "lower" signal the generator provides a "lower" pulse as an input to the Raise-Lower Activate Circuit 11. Upon the coincidence of a "lower pulse" and a signal indicating that rectifier unit 3d is high (awaiting being returned to "in range" operation) the activate circuit 11 provides a "lower signal" to the Tap Change Activate and Relay Circuit 17 and to the Magnetic Amplifier Activate and Relay Circuit 18, whereupon the state of magnetic amplifier 3c will be changed and, if necessary, the tap changer for supply transformer 3d will have its tap setting lowered by one step.

If, upon the lowering of the voltage on rectifier unit 3d, the load current I5, as monitored by the Reference and Main Comparator 7, is determined as being below the lower dead-band reference limit, a binary "1" and "1" (raise) signal is produced. That signal is decoded by the Raise-Lower Decoder 8 and a binary "1" ('-'raise") signal is provided to the Up-Down Counter. This causes the counter to begin counting up. After counting up to its upper time-out point the counter provides a "raise" signal to the Raise-Lower Pulse Generator Circuit 10. In response to that signal, the pulse circuit 10 produces a "raise pulse" and supplies it to the Raise-Lower Activate Circuit 11. Upon the coincidence of the "raise" pulse and the signal from the High-Low switch 16 indicating that unit 1d has been operating "in range" continuously for the longest immediately preceding period of time and is therefore available to be overloaded, the activate circuit 11 provides a "raise signal" to the Tap Changer Activate and to the Magnetic Amplifier Activate, whereupon the state of magnetic amplifier 1c is changed and, if necessary, the tap setting of tap changer 1a is raised one step in order to increase the output current of unit 1d and to bring the load current up to the preselected magnitude.

Since unit 1d is now overloaded, the Overload Decoder 20 produces a binary signal indicating that a unit is overloaded and provides it to the timer 24 to enable the timer to begin counting. At the same time the Overload Decoder provides a signal to the Overload Sequence Control and Position Used Circuit 21 to clear its first shift register. This action results in the first position of the second shift register of circuit 21 filling, followed by the filling of the second position of the fourth shift register and the filling of the third position of the third shift register.

After an hour the timer 24 causes the Raise-Lower Decoder 8 to produce a "lower" signal which is acted upon by the Up-Down Counter and the Raise-Lower Pulse Generator to produce a "lower" pulse. The coincidence of that pulse and the signal from the Overload Sequence Control and Position Used Circuit 22 indicating that unit 1d is overloaded causes the Raise-Lower Activate Circuit 11 to initiate the lowering of the output of that unit.

If, upon the lowering of the output of rectifier unit 1d, the load current I5 drops below the preselected level, the Raise-Lower Decoder 8, in response to the Reference and Main Comparator 7, will provide a "raise" signal. In response to that raise signal a raise pulse will be provided by the generator 10 to the activate circuit 11. The coincidence of the "raise pulse" and the signal from the circuit 21 (indicating that rectifier unit 2d has been operating "in range" continuously for the longest period of time) causes the Raise-Lower Activate circuit to raise the output of that unit via the Magnetic Amplifier Activate and Relay Circuit and, if necessary, the Tap Changer Activate and Relay Circuit.

In the previously described example of "sequential basis" operation it was assumed that only one rectifier unit was overloaded at any one time. I call such operation Case 1 operation and in such operation, each rectifier unit is only overloaded for 1 hour out of each four hours.

Owing to the voltage variations among the rectifier groups two or more rectifier units may be operating in an overloaded condition at the same time. The condition wherein two rectifier units operating in an overload state at the same time I call Case 2 operation and the condition wherein three rectifier units operate in an overloaded state at the same time I call Case 3 operation.

It should be pointed out at this juncture that my regulator includes additional circuitry (not shown) which precludes system operation if all units would be overloaded at the same time.

Even though plural units may be called upon to operate in an overloaded state in order to supply the preselected level of load current, regulator 6 minimizes overheating of the rectifier transformers by effectuating "sequence basis" operation wherein rectifier units which are overloaded are returned to "in range" operation after a predetermined period of time. For example, if in supplying the preselected magnitude of load current I5, an unbalance exists wherein two rectifier units, e.g., units 1d and 2d, are overloaded at one time (i.e. Case 2 operation), my regulator operates as follows. The Unit Overload Comparator 19 provides binary output signals indicating that both units 1d and 2d are overloaded. These signals are supplied to the Overload Decoder 20 which decodes the information and supplies it to the Overload Sequence Control and Position Used circuits 21 and 22. The Overload Decoder also supplies the binary signal to start the timer 24 and a second binary signal to activate the Overload Auxiliary Circuit 23. This circuit causes the High-Low Switch 16 to block the passage of "current basis signals" while enabling the passage of "sequence basis signals" to the Raise-Lower Activate Circuit 11.

Assuming that the rectifier units had previously gone "in range" operation in numerical order, upon the production of the binary signals indicating that units 1d and 2d have become overloaded, the shift registers in circuit 21 associated with those units are cleared and the first position in the third shift register fills, followed by the filling of the second position in the fourth shift register. The filling of these positions indicates that as of that moment rectifier unit 3d has been operating "in range" continuously for the longest immediately preceding period of time and that rectifier unit 4d has been "in range" for the next longest period of time (which in this case, is the shortest period of time). At the same time the shift registers in circuit 22 associated with the overloaded units are filled.

If plural units begin overloaded operation at the same time (which would normally be the case) the shift registers associated with the overloaded units would have their positions filled in the order in which they receive clock pulses.

In the instant example it shall be assumed that in response to the detection of overloaded operation of units 1d and 2d the first shift register of circuit 22 (i.e., the shift register associated with unit 1d) has its first position filled and that the second shift register (i.e. the shift register associated with unit 2d) has its second position filled.

After counting clock pulses for approximately 1 hour the Timer 24 provides a "lower" signal to the Raise-Lower Decoder which in turn provides a "lower" signal to the Up-Down Counter Circuit 9. In response to that signal the counter begins counting down to its lower time-out point and upon reaching it, provides a lower signal to the pulse generator 10. In response to that signal the pulse generator provides a "lower pulse" to one input of the Raise-Lower Activate Circuit 11.

Upon the coincidence of the "lower pulse" and the signal indicating that unit 1d has been overloaded for the longest immediately preceding period of time, the Raise-Lower Activate Circuit 11 provides output signals to the magnetic amplifier activate and to the tap changer activate to effect the lowering of the voltage applied to rectifier unit 1d whereupon unit 1d ceases overloaded operation and begins "in range" operation. At this time the first shift register of circuit 21 (the shift register associated with rectifier unit 1d) has its third position filled (which indicates that as of that moment rectifier unit 1d has been operating "in range" continuously for the shortest immediately preceding period of time).

If, due to the lowering of the output of rectifier unit 1d or a change in the load characteristics or for other reasons, the magnitude of load current I5 drops below the preselected level, the Reference and Main Comparator 7 provides a "raise" signal which is decoded by the Raise-Lower Decoder 8 to start the Up-Down Counter Circuit 9 counting up. Upon reaching its upper time-out point, counter circuit 9 provides a "raise signal" which is converted into a "raise pulse" by the pulse generator 10. Upon the coincidence of the "raise pulse" and the signal indicating that unit 3d has been operating "in range" continuously for the longest immediately preceding period of time, the Raise-Lower Activate Circuit 11 provides output signals to the magnetic amplifier activate and to the tap changer activate to effect the raising of the voltage applied to rectifier unit 3d whereupon unit 3d ceases "in range" operation and commences "overloaded" operation. The overloading of rectifier unit 3d causes timer 24 to begin counting clock pulses. At the end of approximately 1 hour the timer provides a "lower" signal to the Raise-Lower Decoder which results in the provision of a "lower" pulse to the Raise-Lower Activate Circuit. Upon the coincidence of the "lower pulse" and the signal indicating that rectifier unit 2d has been overloaded for the longest immediately preceding period of time, the activate circuit 11 provides output signals to the magnetic amplifier activate and to the tap changer activate to effect the lowering of the voltage applied to rectifier 2d, whereupon unit 2d ceases overloaded operation and commences "in range" operation.

Case 2 sequential operation will continue in a similar manner with two units being overloaded at any one time so long as such operation is necessary to maintain the magnitude of load current at the preselected level. It should be appreciated that in Case 2 operation each rectifier unit will be overloaded for 2 hours out of 4 hours.

If three groups are overloaded at one time in providing the load with the preselected level of current (i.e. if the regulator is operating on a "case 3" basis) operation of the regulator will be similar to the above-described case 1 and case 2 operation, save for the fact that each unit will be overloaded for 3 hours out of 4 hours.

Irrespective of whether the regulator is operating on a case 1, case 2 or case 3 basis, the net heating effect on each group's rectifier transformer will be approximately the same. For example, in case 2 operation even though each rectifier unit is overloaded for twice as long as in case 1 operation the net heating effect on the rectifier transformers is approximately the same as in case 1 operation since the excess current (i.e. the amount of current above full rated current provided by a unit when overloaded) per group is less than in a case 1 condition.

As should be appreciated from the above-described sequence basis operations, my regulator ensures that no rectifier unit remains overloaded for longer than a predetermined period of time and that any overload of longer duration (hereinafter called a sustained or continuous overload) is divided among the system's rectifier units. Therefore, the heating of each group's rectifier transformer will be less than the heating of a rectifier transformer supplying a continuously overloaded rectifier unit. Accordingly, the thermal rating of each group's rectifier transformers can be less than the thermal rating of a rectifier transformer capable of supplying a continuously overloaded rectifier unit, thereby effectuating system economy.

Figure 3:
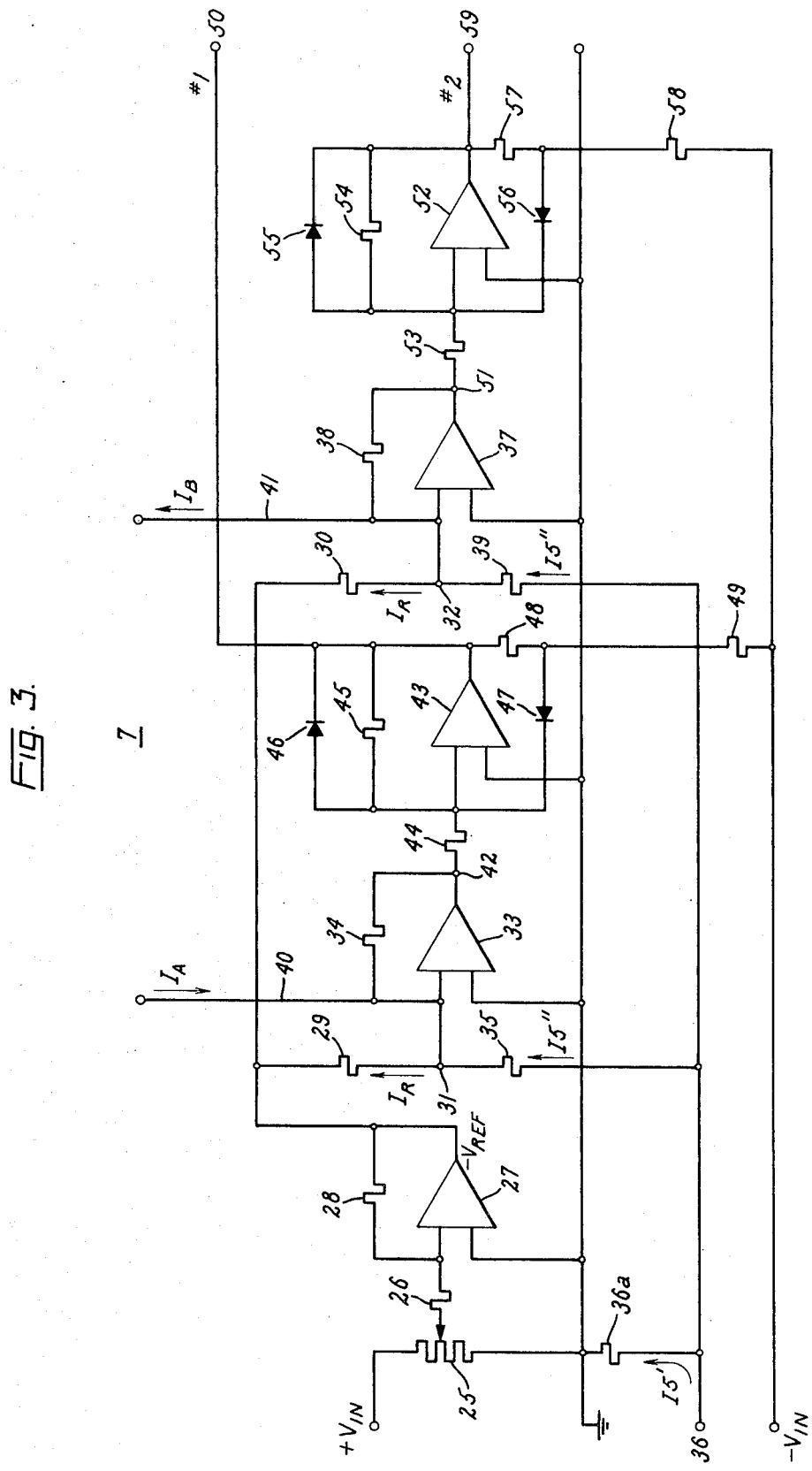
FIG. 3 is a schematic diagram of the Reference and Main Comparator 7 shown in FIG. 2.

FIG. 3 is a schematic diagram of the details of the Reference and Main Comparator Circuit 7. As was previously noted this circuit is adapted for comparing a voltage signal which is proportional to the magnitude of load current to an internally established dead-band reference voltage range and for providing binary output signals indicating the results of that comparison.

The comparator includes a potentiometer 25, an input resistor 26, an inverting operational amplifier 27 including a gain establishing resistor 28. The potentiometer 25 and resistor 26 establish a reference voltage from a source of positive voltage Vin(+). The reference voltage is amplified in amplifier 27 to provide a stiff reference voltage $-V_{REF}$. This reference voltage is provided, via resistors 29 and 30, to summing points 31 and 32, respectively.

Summing point 31 forms the input to an inverting operational amplifier 33. Amplifier 33 includes a gain establishing resistor 34. A resistor 35 is connected between input terminal 36 and summing point 31 and serves as an input thereto.

Summing point 32 forms the input to an inverting operational amplifier 37. Amplifier 37 includes a gain establishing resistor 38. A resistor 39 is connected to input terminal 36 and summing point 32 and serves as an input thereto. A conductor 40 is provided to form another input to summing point 31 and a conductor 41 provides another input to summing point 32.

Input terminal 36 is adapted for receiving, from current transducer means, not shown, a current $+I5'$ proportional to the magnitude of current $+I5$ flowing through load 5. This current passes through a resistor 36a. A portion of current $I5'$ is denoted as $I5''$ and is provided, via input resistor 35 to summing point 31. The direction of flow of current $+I5''$ is as shown in the drawing. The reference voltage $V_{REF}$ establishes a current $-I_R$ flowing, in the direction shown, through resistor 29 from summing point 31. A preselected current $+I_A$, whose direction of flow is shown in the drawing, is supplied from a source not shown as another input to summing point 31.

The algebraic sum of currents $-I_R$ and $+I_A$ establish a bias level which current $+I5''$ must exceed before operational amplifier 33 changes state to provide a negative output signal at its output terminal 42. That bias level serves to define the lower limit of the dead-band reference voltage.

The output of operational amplifier 33 is amplified and inverted by an inverting operational amplifier 43. To that end amplifier 43 has associated therewith an input resistor 44, a gain establishing resistor 45 and a negative excursion clamping diode 46. The output of amplifier 43 is clamped by the interaction of clamping diode 47 and a voltage divider composed of resistors 48 and 49 connected to a source of negative voltage Vin(−) and is provided at terminal 50.

A similar portion of the current $I5'$ is also provided via input resistor 39 to summing point 32. This current is also denoted as $I5''$ and its direction of flow is as shown in the drawing. The reference voltage $-V_{REF}$ establishes a current $-I_R$ flowing, in the direction shown, through resistor 30 from summing point 32. A preselected current $-I_B$ whose magnitude is the same as $+I_A$ (but is flowing in the opposite direction), is supplied from a source not shown as another input to summing point 32.

The algebraic sum of currents $-I_R$ and $-I_B$ establish a bias level which current $+I5''$ must exceed before operational amplifier 37 changes state to provide a negative output signal at its output terminal 51. That bias level serves to define the upper limit of the dead-band reference voltage.

The output of operational amplifier 37 is amplified and inverted by an inverting operational amplifier 52. To that end amplifier 52 has associated therewith an input resistor 53, a gain establishing resistor 54 and a negative excursion clamping diode 55. The output of amplifier 52 is clipped by the interaction of a clamping diode 56 and a voltage divider composed of resistors 57 and 58 connected to the source $V_{IN}(-)$ and is provided at terminal 59.

Operation of the comparator circuit 7 can best be understood from the following examples. Assuming that the voltage produced by current I5' passing through resistor 36a is below the lower dead-band voltage level (i.e. +I5'' is less than the sum of $-I_R + I_A$), amplifier 33 will provide a positive voltage at its output. That output is amplified and inverted by amplifier 43 to provide a binary "0" output at terminal 50. Since current +I5'' is less than the sum of $-I_R + I_A$ it also must be less than $-I_R - I_B$ (remembering that $I_A = I_B$). Accordingly, the output of operational amplifier 37 will be positive. That positive output signal is amplified and inverted by amplifier 52 to provide a binary "0" output at terminal 59.

The presence of binary "0" signals at terminals 50 and 59 indicates that the magnitude of load current must be increased.

Assuming that +I5'' is greater than the sum of $-I_R + I_A$ but is less than $-I_R - I_B$ the output of amplifier 33 would be negative. The negative signal is inverted by operational amplifier 43 to provide a binary "1" at its output terminal 50. Since +I5'' is less than the sum of $-I_R$ and $-I_B$ the output of amplifier 52 will remain binary "0" and will appear at terminal 59.

The presence of a binary "1" signal at terminal 50 and a binary "0" signal at terminal 59 indicates that the magnitude of load current does not need to be changed.

Assuming that +I5'' is greater than both the sum of $-I_R + I_A$ and the sum of $-I_R - I_B$ the output of both amplifiers 43 and 52 would be a binary "1".

The presence of binary "1" signals at terminals 50 and 59 indicates that the magnitude of load current must be decreased.

It should be appreciated by adjusting the values of $V_{REF}$, that the level of load current can be set as desired. By adjusting the magnitudes of $I_A$ and $I_B$, the width of the dead-band reference voltage can be varied.

Figure 4:
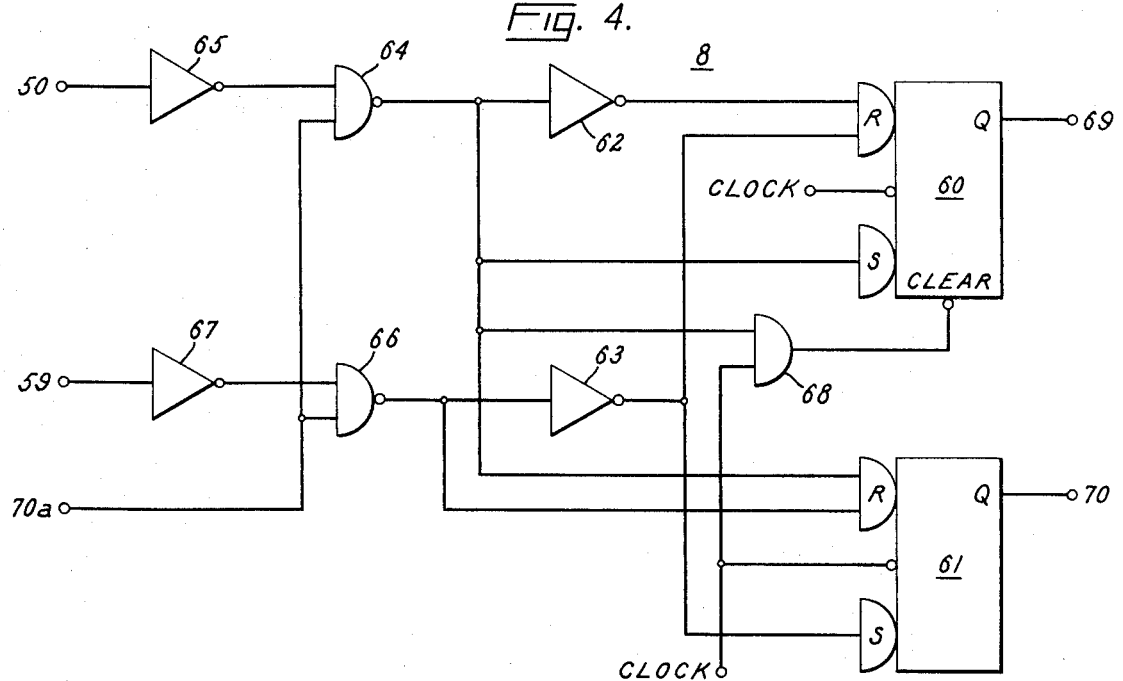
FIG. 4 is a schematic diagram of the Raise-Lower Decoder 8 shown in FIG. 2.

The binary output signals appearing at terminals 50 and 59 are provided as inputs to the Raise-Lower Decoder Circuit 8. This circuit is shown in schematic form in FIG. 4.

As was previously noted the Raise-Lower Decoder is adapted for decoding the output of the Reference and Main Comparator Circuit 7. To that end it includes a pair of R-S flip-flops 60 and 61.

As is known, in response to the "0" to "1" going portion of a clock pulse, input information supplied to an R-S flip-flop is entered into the first stage thereof. The information does not appear at the output (i.e., the Q and $\overline{Q}$) until the "1" to "0" portion of the clock pulse occurs. A "0" input to the clear terminal immediately clears the flip-flop.

The Q output of flip-flop 60 forms the raise output of decoder 8, i.e., if the Q output flip-flop 60 is binary "1" this indicates that a "raise" is required. The Q output of flip-flop 61 forms the "lower" output of the decoder, i.e., if the Q output of flip-flop 61 is binary "1" this indicates that a "lower" is required.

The R input to flip-flop 60 is provided via inverters 62 and 63. The input to inverter 62 is provided by NAND gate 64. The NAND gate 64 has two inputs. One input is coupled through inverter 65 from the comparator output terminal 50 and the other input is provided from the timer circuit 24 at terminal 70a. The input to inverter 63 is provided by NAND gate 66. NAND gate 66 has two inputs, one input is coupled through inverter 67 from the comparator output terminal 59 and the other input is provided from terminal 70a.

The S input to flip-flop 60 is provided from the output of NAND gate 64.

The R inputs to flip-flop 61 is provided by the output of NAND gate 64 and NAND gate 66.

The S input to flip-flop 61 is provided from the output of inverter 63.

As can be seen, the Raise-Lower Decoder 8 also includes a two input NAND gate 68. The output of the gate is coupled to the clear terminal of flip-flop 60. The input of the NAND gate is provided from the output of NAND gate 64 and the second input is coupled to means (not shown) for providing a clock pulse which is delayed in time from the clock pulse used for controlling flip-flop 60. (This clock is used to control flip-flop 61.)

Operation of the decoder is as follows: if terminal 50 and 59 of comparator 7 are both binary "1" the Q output of flip-flop 60 will be binary "0" and the Q output of flip-flop 61 will be binary "1". If the signals on terminals 50 and 59 are both binary "0" the Q output of flip-flop 60 will be binary "1" and the Q output of flip-flop 61 will be binary "0". If a binary "1" signal appears on terminal 50 and a binary "0" on terminal 59 the Q output on both flip-flops will be binary "0".

The function of NAND gate 68 is to remove any raise signal (i.e. a binary "1") from the Q output of flip-flop 60 if the input signals thereto change (i.e., become a "1" and "0" or a "1" and "1" when the information is clocked into R-S flip-flop 61.

As should be appreciated if a binary "0" signal is provided as an input to NAND gates 64 and 66 the Q output of flip-flop 61 will become binary "1" and the Q output of flip-flop 60 will be binary "0" irrespective of the nature of the signals on comparator terminals 50 and 59. The timer circuit 24 provides such a signal to terminal 70a after counting approximately 1 hour during "sequence basis" regulator operation.

The Q output of flip-flop 60 is denoted as terminal 69 and the Q output of flip-flop 61 is denoted as terminal 70. These terminals serve as two input terminals to the Up-Down Counter Circuit 9.

The details of counter circuit 9 can be seen in FIG. 5. As can be seen the Up-Down Counter Circuit 9 includes a conventional up-down counter 71 composed of four J-K flip-flops, namely flip-flops 71a, 71b, 71c, 71d, and associated NAND gates. As should be appreciated, the NAND gates serve to control the count direction (i.e. whether up or down).

The counter 71 is arranged to count clock pulses which are provided through conductor 72. Clock pulses are supplied to conductor 72 in the following manner: a clock circuit (not shown) provides clock pulses (one each quarter of a second) to one input of a NAND gate 73. This gate includes two other inputs 73a and 73b. If either input 73a or 73b is binary "0", gate 73 will be disabled and no clock pulses will pass therethrough. If both inputs 73a and 73b are binary "1", clock pulses will appear at the output of the gate whereupon they will be inverted by inverter 74 and thereupon provided to conductor 72. The counter is arranged to count up to a preselected time-out point in response to a "count up" command or to count down to a preselected time-out point in response to a "count down" command. Upon reaching either time-out point, a signal indicating that occurrence is produced. The "-count-up" command is provided whenever terminal 69 is at the binary "1" level and the "count-down" command is provided whenever terminal 70 is at the binary "1" level.

The upper time-out point is established by NAND gate 75 which provides a binary "0" output upon the counter reaching that point. To that end the Q outputs of flip-flops 71a, 71b, and 71d and the $\overline{Q}$ output of flip-flop 71c are provided as inputs to NAND gate 75. This establishes the upper time-out point at binary "1101" (11).

Another input to NAND gate 75 is provided from terminal 76. This input disables the NAND gate whenever the counter is reset. To that end terminal 76 is adapted for receipt of a binary "0" reset signal from the Raise-Lower Pulse Circuit 10. This signal is utilized to reset the counter back to a neutral position, binary "1100"a and 71b are binary "1" and the Q output of flip-flops 71c and 71d are binary "0". The resetting of the counter will be explained later.

The lower time-out point is established by NAND gate 77 which provides a binary "0" output upon the counter reaching that point. To that end the $\overline{Q}$ outputs of flip-flops 71a and 71b and the Q outputs of flip-flops 71c and 71d are provided as inputs to NAND gate 77. This establishes the lower time-out point at binary "0011"(12).

Operation of the counter is as follows: in response to a "raise" or binary "1" signal appearing at terminal 69 the counter 71 will count clock pulses received from conductor 72. The counter will continue counting up as long as terminal 69 is binary "1". Upon reaching the upper time-out point, NAND gate 75 will provide a binary "0" at its output terminal 78. This output signal is fed back to input 73a thereby suppressing the passage of further gate signals to the counter. The binary "0" appearing at the output terminal 78 causes the raise-lower pulse circuit 10 to produce a "raise" pulse. After a predetermined period of time Raise-Lower Pulse circuit produces a reset signal at terminal 76 to effectuate resetting of counter 71 to its reset state. This is accomplished by directly setting the flip-flops 71a and 71b and by directly clearing flip-flops 71c and 71d via inverter 80 and NAND gate 81.

As should be appreciated operation of the counter in counting down to its lower time-out point will be effectuated in a similar manner to the counting up operation, and in reaching that point a binary "0" will be provided at output terminal 79. Furthermore, it should be appreciated that if in either counting up or counting down the count direction command signal reverses before the corresponding time-out point is reached the counter will reverse its direction of count and count to the opposite time-out point.

As can be seen the up-down counter circuit 9 also includes a NAND gate 82. One input to this gate is connected to terminal 78, another input is connected to terminal 79 and a third input is connected to a terminal 84. Terminal 84 is adapted for receiving a binary "0" from the raise-lower pulse circuit at a predetermined point in the operation of that circuit (this function will be considered in the discussion of the details of the raise lower pulse circuit). As should be appreciated if terminal 78 is at binary "0" (indicating a raise is desired) or if terminal 79 is at binary "0" (indicating that a lower is desired) the output of NAND gate 82 will be binary "1". The output of this gate is provided via terminal 85 as an input to the Raise-Lower Pulse Generator Circuit 10 to actuate it.

Figure 6:
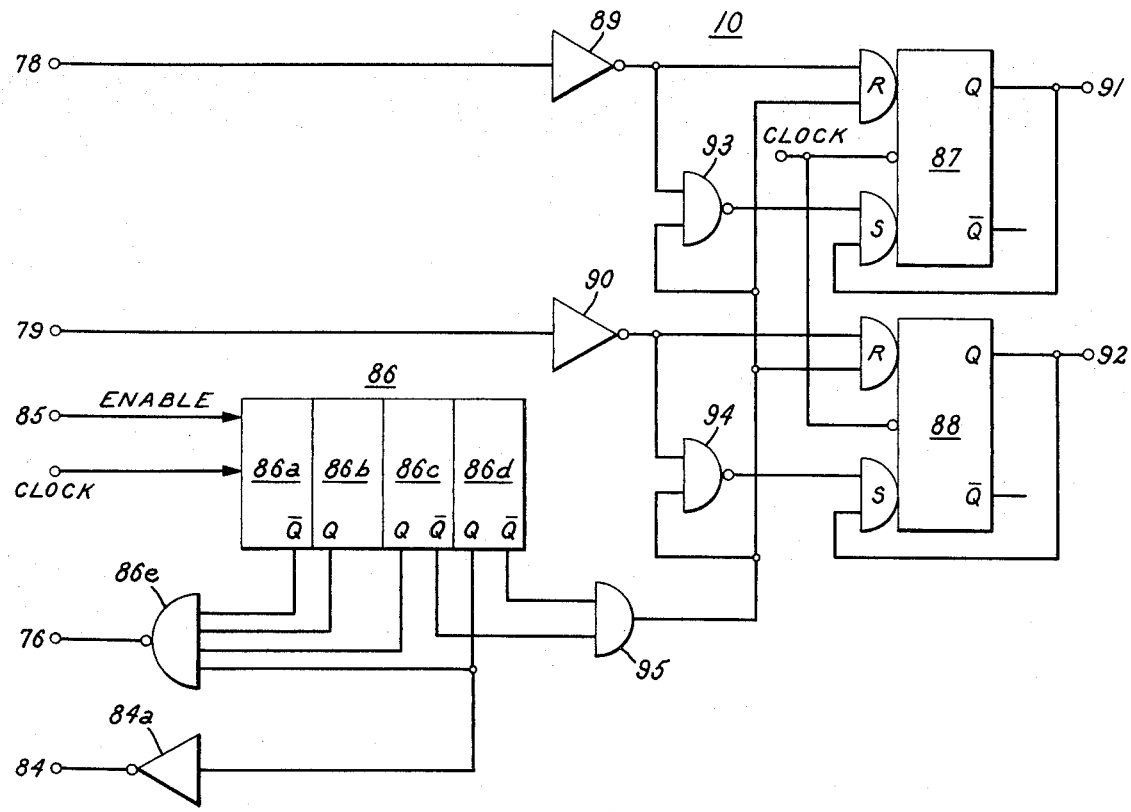
FIG. 6 is a schematic diagram of the Raise-Lower Pulse Generator 10 shown in FIG. 2.

FIG. 6 is a schematic diagram of the Pulse Generator circuit 10. As can be seen therein the circuit 10 includes a divide-by-16 counter, 86, including four clocked flip-flops 86a, 86b, 86c and 86d. The counter is arranged to count quarter-of-a-second frequency clock pulses applied thereto from a clock circuit (not shown) in response to the presence of a binary "enable" signal (denoted as a "time on 1" signal). This signal is provided at terminal 85 by the up-down counter circuit 9 whenever there is a binary "0" at its "raise" terminal 78 or at its "lower" terminal 79 or at the input terminal 84.

As can be seen the $\overline{Q}$ output of flip-flop 86a and the Q outputs of flip-flops 86b, 86c and 86d are provided as inputs to a NAND gate 86e. Accordingly, at the termination of the 15th counted clock pulse the output of NAND gate 86e will be a binary "0" whereupon the up-down counter 71 of circuit 9 is reset via terminal 76.

The pulse circuit 10 also includes a pair of R-S flip-flops 87 and 88. Flip-flop 87 is adapted for producing a signal indicating that the voltage on a rectifier unit should be raised while flip-flop 88 is adapted for producing a signal indicating that the voltage on a rectifier unit should be lowered.

The flip-flops provide this information at their Q output terminals in response to the presence of a pair of binary "1" signals at their R inputs. To that end an inverter 89 is connected between the "raise" output terminal 78 of the Up-Down Counter Circuit 9 and one R input of flip-flop 87 and an inverter 90 is connected between the "lower" output terminal 79 of the counter and one R input of flip-flop 88. If terminal 78 is at the binary "0" level and the second input to the R terminal of flip-flop 87 is a binary "1" signal, upon being clocked the Q output of flip-flop 87 will become binary "1". The Q output of flip-flop 87 is provided by terminal 91. In a similar manner if terminal 79 is at the binary "0" level and the second input to the R terminal of flip-flop 88 is a binary "1" signal, upon being clocked the Q output of flip-flop 87 will become binary "1". The Q output of flip-flop 88 is provided by terminal 92.

A pair of NAND gates 93 and 94 and an AND gate 95 are coupled to the flip-flops 87 and 89 and to the counter 86 in order to terminate the binary "1" signals at the Q output of the flip-flops after a short period of time (e.g., approximately ¾ of a second) in order to thereby provide the "raise" or the "lower" pulse output.

As can be seen AND gate 95 has two inputs, those being the $\overline{Q}$ outputs of flip-flops 86c and 86d. If either $\overline{Q}$ output of flip-flop 86c or 86d is a binary "0" (this occurs after the counter counts the fourth clock pulse) and the output of AND gate 95 will be at the binary "0" level.

Assuming that both of the R inputs to flip-flop 87 are at the binary "1" level, upon being clocked the output terminal 91 of flip-flop 87 will become binary "1". At essentially the same time that the Q output of flip-flop 87 becomes a binary "1" signal, the counter is enabled by a binary "1" signal appearing at terminal 85 and begins counting clock pulses applied thereto. After counting four clock pulses the $\overline{Q}$ output of flip-flop 86c becomes binary "0" whereupon the output of AND gate 95 becomes binary "0". The binary "0" is applied to the second R input of flip-flop 87 and at the same time to one input of NAND gate 93. This causes the gate output to become binary "1" which is applied to the one S input of the flip-flop. The output terminal 91 is connected to a second S input to flip-flop 87. Accordingly, when clocked the Q output of the flip-flop 87 will become binary "0", Thereby terminating the output pulse on terminal 91.

Terminal 84 is connected to the Q output of flip-flop 86d via inverter 84a. Therefore when counter 86 reaches the binary "0001" (8) position, a binary "0" signal will be applied to NAND gate 82 of the Up-Down Counter Circuit 9. This signal is effective for locking the "time on 1" signal (i.e. binary "1") until counter 86 reaches its 0000 condition, otherwise, the disappearance of the "raise" or "lower" signal on terminal 78 or 79, respectively, would disable the counter 86 (by removing the "enable" signal thereto) and it could not reset itself.

The "raise" or the "lower" pulse from the pulse circuit 10 is provided as an input to the Raise-Lower Activate Circuit 11. These inputs merely indicate whether or not any unit should have its voltage raised or lowered. The information as to which unit should be raised or lowered is supplied from the High-Low Switch Circuit 16.

The information as to which unit should be raised or lowered on a "current basis" is provided to the high-low switch via the following circuits: the Unit-Feedback Amplifier 12, the Unit Comparator 13, the High-Low Hold Circuit 14 and the High-Low Decoder 15.

Figure 7:
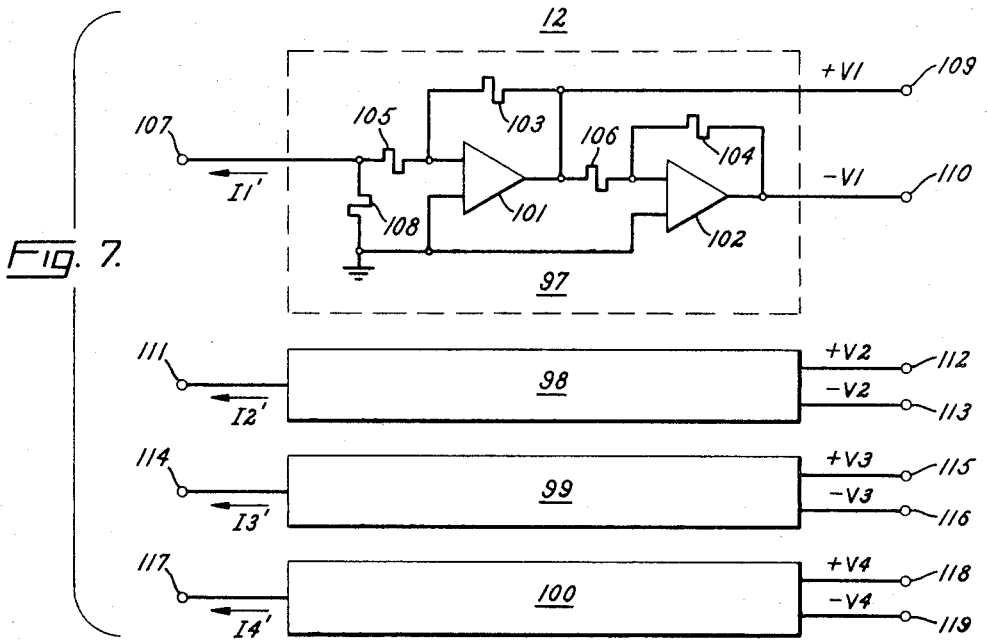
FIG. 7 is a schematic diagram of the Unit Feedback Amplifier 12 shown in FIG. 2.

As can be seen in FIG. 7 the Unit Feedback Amplifier 12 includes four identical subcircuits 97, 98, 99 and 100.

Subcircuit 97 includes a pair of inverting operational amplifiers 101 and 102 having associated therewith gain setting resistors 103 and 104, respectively, and input resistors 105 and 106, respectively.

The input to subcircuit 97 is provided via terminal 107. This terminal is adapted for receiving current I1' (which as previously noted is proportional to the magnitude of current provided by rectifier unit 1d). A resistor 108 is provided at the input to amplifier 101 to convert I1' into a voltage.

Amplifier 101 inverts and stiffens the voltage appearing at its input to provide a voltage +V1 which is proportional to I1 at terminal 109. Amplifier 102 inverts the output of amplifier 101 to provide complementary voltage −V1 at terminal 110.

Subcircuit 98 converts current I2' which is supplied to its input terminal 111 into complementary output voltages +V2 and −V2 (each proportional to I2') on terminals 112 and 113 respectively.

Subcircuit 99 converts current I3', which is supplied to its input terminal 114, into complementary output voltages +V3 and −V3 (each proportional to I3') on terminals 115 and 116, respectively.

Subcircuit 100 converts current I4' which is supplied at its input terminal 115 into complementary output voltages +V4 and −V4 (each proportional to I4') on terminals 118 and 119.

Figure 8:
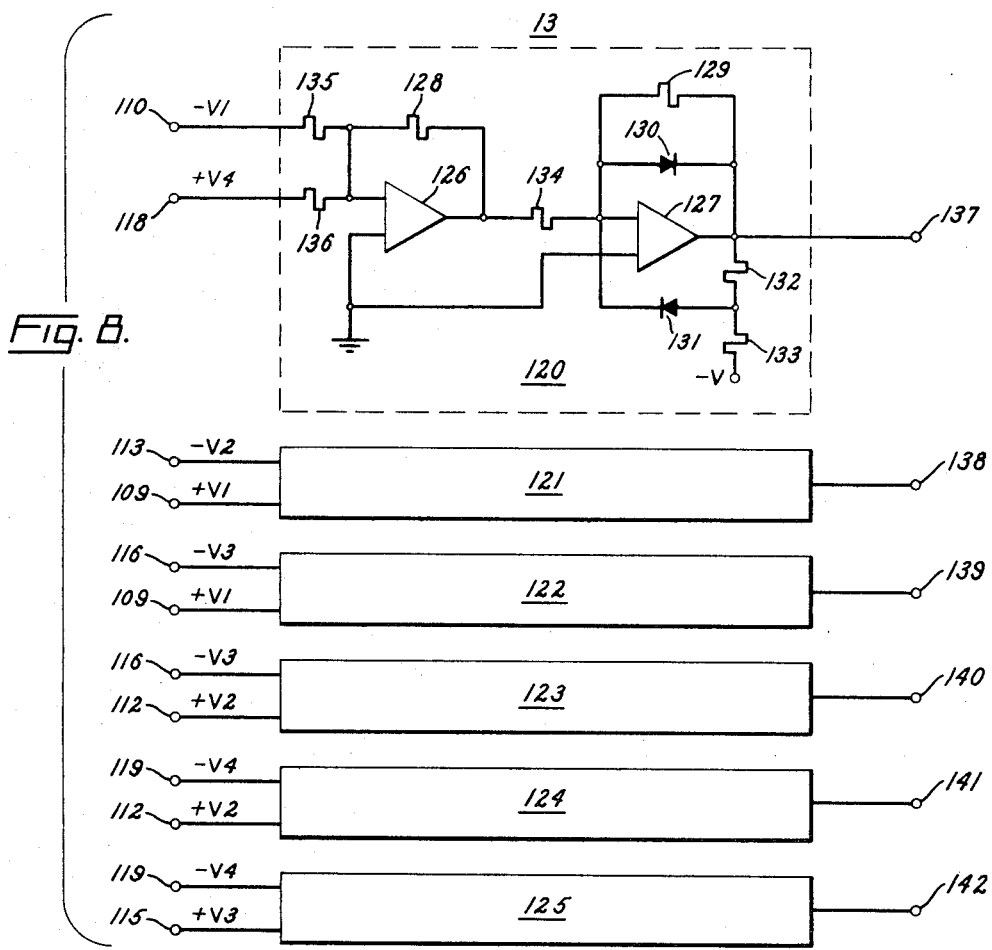
FIG. 8 is a schematic diagram of the Unit Comparator 13 shown in FIG. 2.
Figure 9:
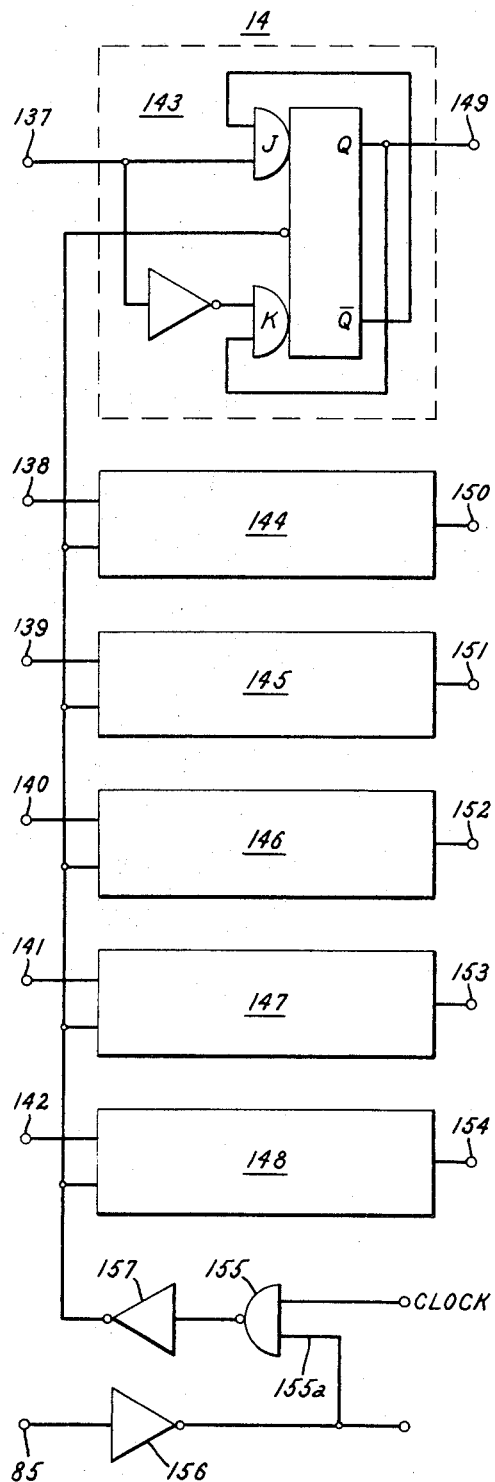
FIG. 9 is a schematic diagram of the High-Low Hold Circuit 14 shown in FIG. 2.

The Unit Comparator Circuit 13 is shown in detail in FIG. 8 and includes six identical subcircuits 120, 121, 122, 123, 124 and 125, each of which is operative for comparing two input signals and for providing a binary output signal indicating which of the two compared signals is of greater absolute magnitude.

As can be seen subcircuit 120 includes a pair of inverting operational amplifiers 126 and 127, each of which has associated therewith a gain establishing resistor 128 and 129, respectively.

Amplifier 127 is provided to amplify, invert and clip the voltage appearing at the output of amplifier 126. To that end amplifier 127 has associated therewith diode 130 for clamping the negative output thereof and diode 131, which, in conjunction with the voltage divider formed of resistor 132 and 133 clamps the positive output voltage.

Amplifier 126 will provide a positive voltage on resistor 134 whenever the magnitude of current flowing through resistor 135 is greater than the magnitude of current flowing through resistor 136. Resistors 135 and 136 are precision resistors of the same value and are connected to terminals 110 and 118 respectively (which provide voltages −V1 and +V4, respectively). Accordingly, if the absolute magnitude of −V1 is greater than the absolute magnitude of +V4 (thereby indicating that unit 1d is providing more current than unit 4d) the output of amplifier 126 will be positive. Amplifier 127 amplifies, inverts and clips the output voltage of amplifier 126 to provide a binary "0" output signal at terminal 137. If the absolute magnitude of −V1 is less than the absolute magnitude of +V4 (thereby indicating that unit 4d is providing more current than unit 1d) a binary "1" will appear at output terminal 137.

Subcircuit 121 has as its input terminals feedback amplifier output terminals 113 and 109 supplying voltages −V2 and +V1, respectively. The output of subcircuit 121 is provided at terminal 138 and is at the binary "1" level whenever the current output of unit 1d is greater than unit 2d.

Subcircuit 122 has as its input terminals feedback amplifier output terminals 116 and 109 supplying voltages −V3 and +V1, respectively. The output of subcircuit 122 is provided at terminal 139 and is at the binary "1" level whenever the current output of unit 1d is greater than unit 3d.

Subcircuit 123 has as its input terminals feedback amplifier output terminals 116 and 112 supplying voltages −V3 and +V2, respectively. The output of subcircuit 123 is provided at terminals 140 and is at the binary "1" level whenever the current output of unit 2d is greater than unit 3d.

Subcircuit 124 has as its input terminals feedback amplifier output terminals 119 and 112 supplying voltages −V4 and +V2, respectively. The output of subcircuit 124 is provided at terminal 141 and is at the binary "1" level whenever the current output of unit 2d is greater than unit 4d.

Subcircuit 125 has as its input terminals feedback amplifier output terminals 119 and 115 supplying voltages −V4 and +V3, respectively. The output of subcircuit 125 is provided at terminal 142 and is at the binary "1" level whenever the current output of unit 3d is greater than unit 4d.

The High-Low Hold Circuit 14 consists of six identical subcircuits 143, 144, 145, 146, 147, and 148 each including a J-K flip-flop. The subcircuit inputs are arranged as a data latch (having an inverter connected between the J and K inputs) adapted for storing the information provided by an output of the Unit Comparator 13. Subcircuit 143 stores information regarding whether unit 1d or unit 4d is providing more current. To that end the input to the data latch is provided from terminal 137.

Subcircuit 144 stores information regarding whether unit 1d or 2d is providing more current. To that end the input to that data latch is provided from terminal 138.

Subcircuit 145 stores information regarding whether unit 1d or 3d is providing more current. To that end the input to that data latch is provided from terminal 139.

Subcircuit 146 stores information regarding whether unit 2d or 3d is providing more current. To that end the input to that data latch is provided from terminal 140.

Subcircuit 147 stores information regarding whether unit 2d or 3d is providing more current. To that end the input to that data latch is provided from terminal 141.

Subcircuit 148 stores information regarding whether unit 3d or 4d is providing more current. To that end the input to that data latch is provided from terminal 142.

The Q output of subcircuit 143 appears at terminal 149 and is at the binary "1" level if unit 4d is providing more current than unit 1d.

The Q output of subcircuit 144 appears at terminal 150 and is at the binary "1" level if unit 1d is providing more current than unit 2d.

The Q output of subcircuit 145 appears at terminal 151 and is at the binary "1" level if unit 1d is providing more current than unit 3d.

The Q output of subcircuit 146 appears at terminal 152 and is at the binary "1" level if unit 2d is providing more current than unit 3d.

The Q output of subcircuit 147 appears at terminal 153 and is at the binary "1" level if unit 2d is providing more current than unit 4d.

The Q output of subcircuit 148 appears at terminal 154 and is at the binary "1" level if unit 3d is providing more current than unit 4d.

The information provided at the J-K inputs to the flip-flops is stored into the first stage thereof on the "0" to "1" transition of the applied clock pulses and appears at the Q and $\overline{Q}$ outputs on the "1" to "0" transition thereof.

The clock pulses are provided by a clock circuit (not shown) to one input of a NAND gate 155. The other input, 155a, to this NAND gate is taken off inverter 156. The input to inverter 156 is from terminal 85 of the Up-Down Counter Circuit 9. The output of the NAND gate is inverted by inverter 157 and supplied to the clock inputs of the circuit flip-flops.

As should be appreciated the flip-flops will be provided with clock pulses so long as input 155a is binary "1".

As will be remembered whenever the up-down counter 71 reaches a time-out point (thereby indicating that a unit should be raised or lowered) a "time on 1" (binary "1") signal is provided at terminal 85. When such an event occurs the binary "1" signal appearing at terminal 85 will be inverted by inverter 156 whereupon the clock signals to the High-Low Hold Circuit flip-flops will be disabled. The function is provided to ensure that the flip-flops remain in the state they are in at the time that the counter 71 is providing either a raise or a lower signal, irrespective of whether or not their inputs have changed.

Figure 10:
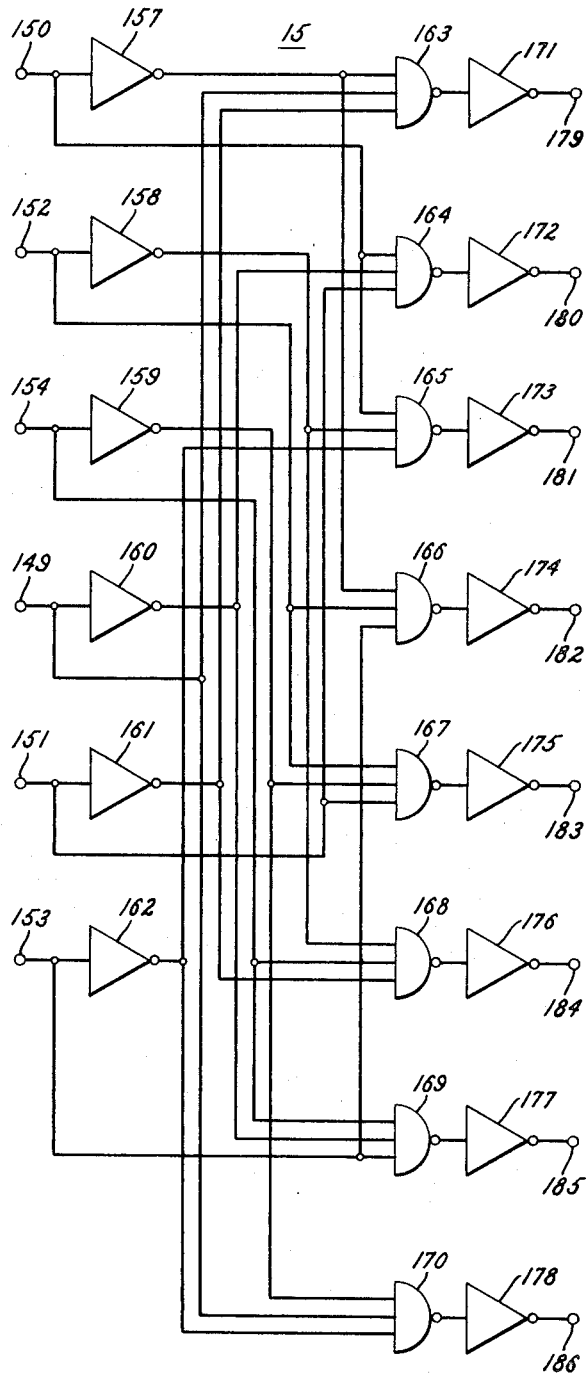
FIG. 10 is a schematic diagram of the High-Low Decoder 15 shown in FIG. 2.

The details of the High-Low Decoder Circuit 15 are shown in FIG. 10. As previously noted the function of this circuit is to take the information supplied by the High-Low Hold Circuit 14 (i.e. the information regarding the relative magnitude of the individual unit's output currents) and decode it, to provide binary signals indicating which unit is providing the most output current and which unit is providing the least output current. To that end the decoder 15 includes a plurality of interconnected inverters and NAND gates.

As can be seen there are six input inverters, namely, 157, 158, 159, 160, 161 and 162, eight three-input NAND gates 163, 164, 165, 166, 167, 168, 169 and 170, and eight output inverters 171, 172, 173, 174, 175, 176, 177 and 178.

NAND gate 163 provides a binary "0" signal at its output whenever unit 1d is providing the least current of all of the system's rectifier units and NAND gate 164 provides a binary "0" signal whenever unit 1d is providing the most current.

NAND gate 165 provides a binary "0" signal at its output whenever unit 2d is providing the least current of all of the system's rectifier units and NAND gate 166 provides a binary "0" signal whenever unit 2d is providing the most current.

NAND gate 167 provides a binary "0" signal at its output whenever unit 3d is providing the least current of all the system's rectifier units and NAND gate 168 provides a binary "0" signal whenever unit 3d is providing the most current.

NAND gate 169 provides a binary "0" signal at its output whenever unit 4d is providing the least current of all the system's rectifier units and NAND gate 170 provides a binary "0" signal whenever unit 4d is providing the most current.

The output inverters 171–178 invert the output signals of NAND gates 163–170, respectively, and provide the inverted signals at terminals 179–186 respectively.

In the interests of brevity the interconnections among the inverters and the NAND gates shown in FIG. 10 will not be described herein. Operation of the circuit will, however, be described assuming that unit 1d is providing the least current of all of the rectifier units and that unit 4d is providing the most current.

As will be appreciated in such a condition there will be a binary "0" signal on terminals 150 (indicating that unit 2d is providing more current than unit 1d), a binary "0" signal on terminal 151 (indicating that unit 3d is providing more current than unit 1d), a binary "1" signal on terminal 154 (indicating that unit 4d is providing more current than unit 1d), a binary "0" signal on terminal 153 (indicating that unit 4d is providing more current than unit 2d) and a binary "0" signal on terminal 154 (indicating that unit 4d is providing more current than unit 3d).

The binary "0" signals appearing on terminals 150 and 151 are inverted by inverters 157 and 161, respectively, to provide two binary "1" inputs to NAND gate 163 and the binary "1" signal appearing at terminal 149 serves as the third input thereto. The output of the NAND gate (binary "0") is inverted by inverter 171 to provide a binary "1" signal at terminal 179 indicating that unit 1d is providing the least current and is available to have its voltage raised.

The binary "1" signal appearing on terminal 149 provides one input to NAND gate 170 and the binary "0" signals appearing on terminals 153 and 154 are inverted by inverters 162 and 159, respectively, to provide two other binary "1" signals thereto. The output of the NAND gate 170 (binary "0") is inverted by inverter 178 to provide a binary "1" signal at terminal 186 indicating that unit 4d is providing the most current and is available to have its voltage lowered.

Figure 11:
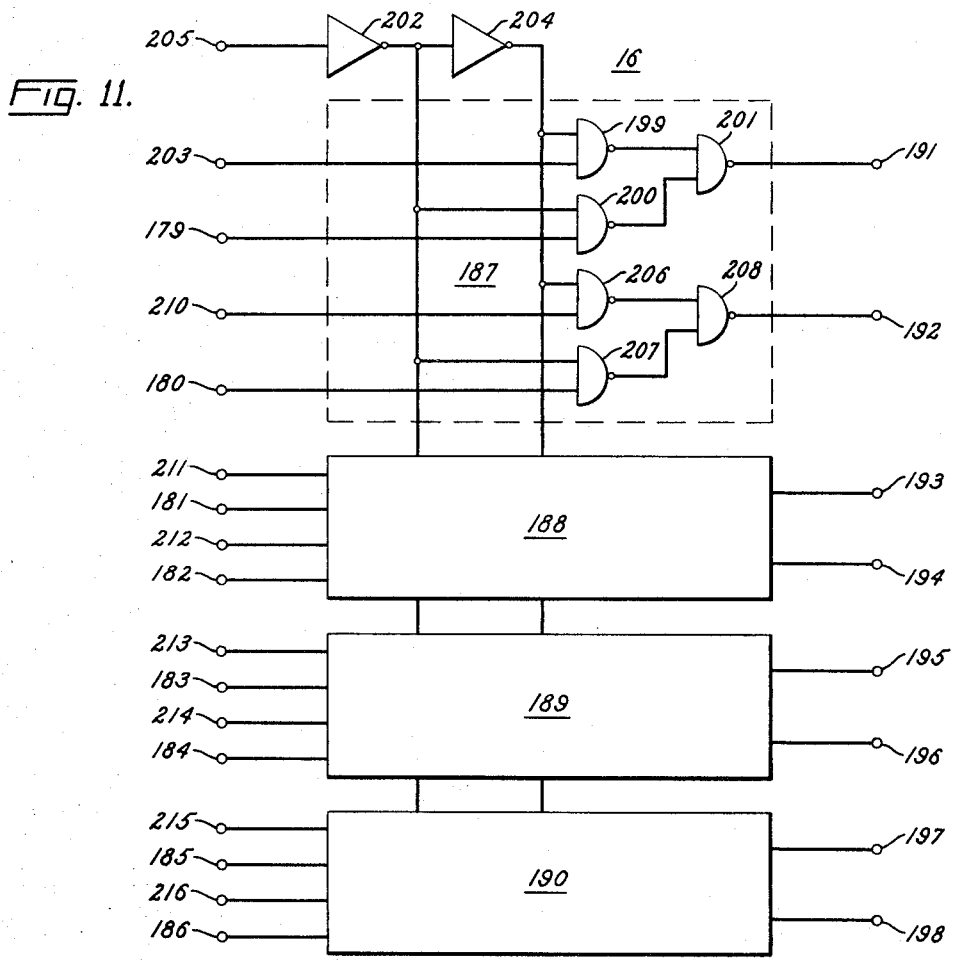
FIG. 11 is a schematic diagram of the High-Low Switch 16 shown in FIG. 2.

The details of the High-Low Switch 16 are shown in FIG. 11. As was previously noted the switch is operative for enabling the passage of "current basis" signals to the Raise-Lower-Activate Circuit 11 and for blocking the passage of "sequence basis" signals thereto, in response to one command and for enabling the passage of "sequence basis" signals to circuit 11 while blocking the passage of "current basis" signals thereto in response to another command.

As can be seen the switch includes four identical subcircuits 187, 188, 189 and 190.

Subcircuit 187 is adapted for receiving two sets of input signals, one set being "current basis" signals from the High-Low Decoder 15 indicating if unit 1d is providing the most current or if it is providing the least current and the other set being "sequence basis" signals from the overload sequence control circuits 21 and 22 indicating which unit has been operating in range for the longest immediately preceding period of time and which unit has been operating overloaded for the longest immediately preceding period of time. In a similar manner subcircuit 188 receives "current basis" and "sequence basis" signals relating to unit 2d, subcircuit 189 receives "current basis" and "sequence basis" signals relating to unit 3d and subcircuit 190 receives "current basis" and "sequence basis" signals relating to unit 4d.

Each subcircuit includes two output terminals, subcircuit 187 includes terminals 191 and 192, subcircuit 188 includes terminals 193 and 194, subcircuit 189 includes terminals 195 and 196 and subcircuit 190 includes terminals 197 and 198.

Output terminal 191 is a binary "1" signal if unit 1d is available to have its voltage raised and output 192 is a binary "1" if unit 1d is available to have its voltage lowered. Terminal 193 is binary "1" if unit 2d is available to have its voltage raised and terminal 194 is binary "1" if unit 2d is available to have its voltage lowered. Terminal 195 is binary "1" if unit 3d is available to have its voltage raised and terminal 196 is binary "1" if unit 3d is available to have its voltage lowered. Terminal 197 is binary "1" if unit 4d is available to have its voltage raised and terminal 198 is binary "1" if unit 4d is available to have its voltage lowered.

As can be seen subcircuit 187 includes NAND gates 199 and 200 whose outputs are supplied to NAND gate 201. A "current basis" signal, from terminal 179, indicating whether or not unit 1d is providing the least current is provided to NAND gate 200. The other input thereto is provided by the output of an inverter 202. A "sequence basis" input signal from the overload circuit 21 and appearing at terminal 203, indicating whether or not unit 1d has been "in range" the longest immediately preceding period of time is provided to NAND gate 199. The other input thereto is provided by the output of an inverter 204.

The input to inverter 202 is provided at terminal 205 of the Overload Auxiliary Circuit 23 and is a binary "0" if the regulator is in the "current basis" mode of operation and is a binary "1" if the regulator is in the "sequence basis" mode.

Assuming that unit 1d is providing the least current of all units but that it had not been operating "in range" continuously for the longest immediately preceding period of time, there will be a binary "1" signal on terminal 179 and a binary "0" at terminal 203. It the Overload Auxiliary Circuit provides a binary "0" at terminal 205 (indicating that "current basis" signals are to be enabled to pass) this signal will be inverted and supplied as an input to NAND gate 200 thereby opening that gate to enable the "current basis" signal from terminal 179 to pass therethrough. At the same time the output of inverter 202 is inverted to provide a binary "0" which disables gate 199 from allowing the passage of "sequence basis" signals therethrough. Since there will be the "0" input from gate 200 at one input to NAND gate 201 its output will become binary "1" indicating that unit 1d is to have its voltage raised.

Assuming that unit 1d has been operating "in range" continuously for the longest immediately preceding period of time and that "sequence basis" operation is required by the Overload Auxiliary Circuit, NAND gate 200 would be disabled and NAND gate 199 enabled, whereupon the output of NAND gate 201 would become binary "1" thereby indicating that unit 1d is to have its voltage raised.

Subcircuit 187 also includes NAND gates 206, 207 and 208. These gates are provided to control the passage of "current basis" and "sequence basis" information relating to whether or not unit 1d is available to have its voltage lowered. To that end the "current basis" input to NAND gate 207 is provided from terminal 180 of the High-Low Decoder 15 and the "sequence basis" input to NAND gate 206 is provided from terminal 210 of the Overload Sequence Circuit 22.

Assuming that unit 1d has been overloaded for the longest immediately preceding period of time a binary "1" signal would appear at terminal 210. The NAND gate 207 will be disabled by the binary "0" signal from inverter 202 while NAND gate 206 is enabled, whereupon the binary "0" output of gate 206 will cause the output of gate 208 to become binary "1" thereby indicating that unit 1d is available to have its voltage lowered.

Lowering the voltage on unit 1d on a "current basis" will proceed in a similar manner to the above-described lowering process.

"Sequence basis" signals to the High-Low Switch 16 are provided by the following circuits: the Unit Overload Comparator 19, the Overload Decoder 20, the Overload Sequence Control and Position Used Circuits 21 and 22 and the Overload Auxiliary Circuit 23.

Figure 12:
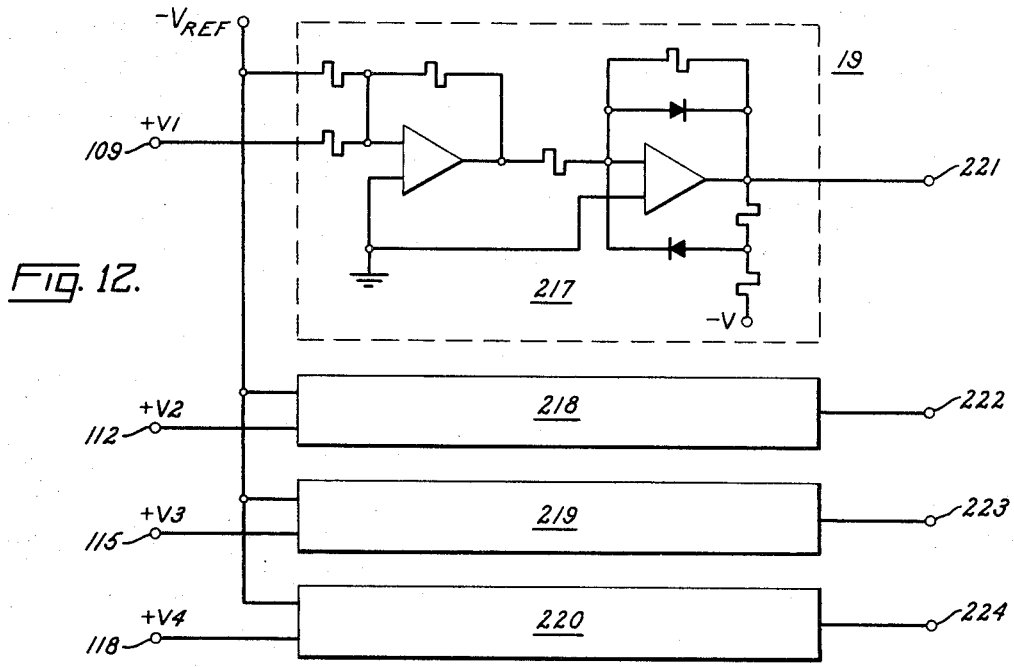
FIG. 12 is a schematic diagram of the Unit Overload Comparator 19 shown in FIG. 2.

The details of the Unit Overload Comparator 19 are shown in FIG. 12. As can be seen therein, the comparator includes four identical subcircuits 217, 218, 219 and 220. Each of the subcircuits is of the same construction as the subcircuits 120-125 of the Unit Comparator Circuit 13. However, instead of comparing two input signals, each of which is proportional to the current output of a different rectifier unit, as do subcircuits 120-125, the subcircuits 217-220 compare a signal proportional to the output of a rectifier unit to a reference signal. The reference signal establishes the maximum current output that a rectifier unit may provide while operating "in range".

As can be seen, one input to subcircuit 217 is provided by terminal 109 of the Feedback Amplifier 12. The signal appearing at this terminal is +V1. The other input to subcircuit 217 is provided by a reference voltage source $-V_{REF}$ (not shown). The output of subcircuit 217 is provided at terminal 221 and is at the binary "1" level if the output of unit 1d is greater than the reference (i.e., if unit 1d is overloaded).

The input to subcircuit 218 is provided by terminal 112, the input to subcircuit 219 is provided by terminal 115 and the input to subcircuit 220 is provided by terminal 118. The output of subcircuits 218, 219 and 220 are provided by terminals 222, 223 and 224, respectively.

Like subcircuit 221 the presence of a binary "1" signal at any of the terminals 222-224 is indicative that their associated rectifier unit is overloaded.

Figure 13:
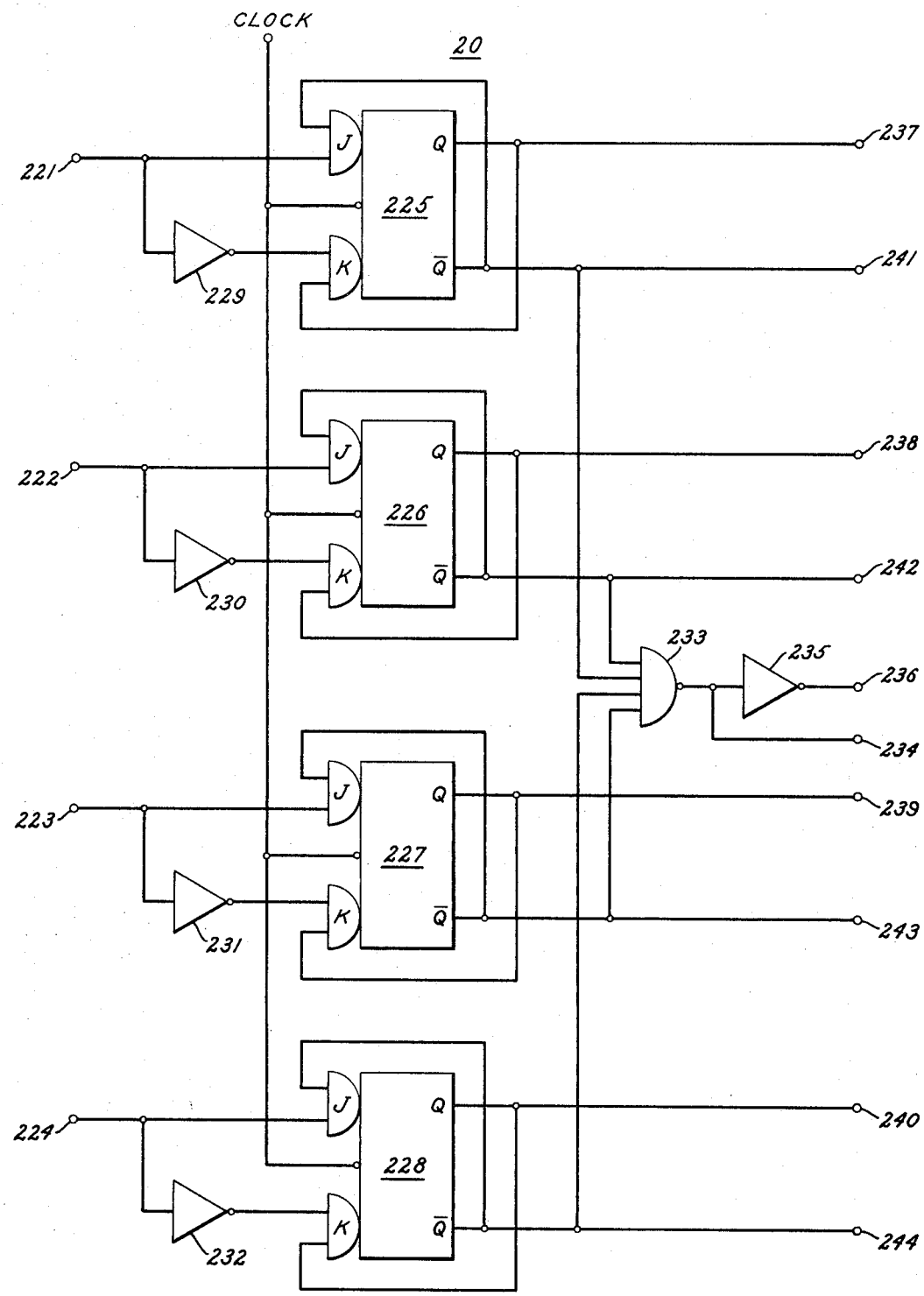
FIG. 13 is a schematic diagram of the Overload Decoder 20 shown in FIG. 2.

The details of the Overload Decoder Circuit 20 are shown in FIG. 13. As can be seen therein the decoder includes four J-K flip-flops, 225, 226, 227 and 228. An inverter 229 is connected between the J and K inputs to flip-flop 225 to serve as a data latch. In a similar manner an inverter 230 is connected between the J and K inputs to flip-flop 226, an inverter 231 is connected between the J and K inputs to flip-flop 227 and an inverter 232 is connected between the J and K inputs to flip-flop 228.

As should be appreciated, if any unit is overloaded the binary signal indicating that condition appearing at the input terminal would result in the Q output of the associated flip-flop becoming binary "1" and the $\overline{Q}$ output thereof becoming binary "0".

The $\overline{Q}$ outputs of the flip-flops are provided as inputs to NAND gate 233. If any rectifier unit is overloaded the $\overline{Q}$ output of its associated flip-flop is a binary "0" signal and the output of NAND gate 233 is a binary "1" signal. Accordingly NAND gate 233 will provide a binary "1" signal whenever any unit is overloaded.

The output of NAND gate 233 is provided directly at terminal 234 and is inverted by an inverter 235 to be provided at terminal 236.

The Q output terminals of the flip-flops are denoted 237, 238, 239 and 240 and are provided as inputs to the Overload Sequence Control and Position Used Circuit 22, and the $\overline{Q}$ output terminals are denoted as 241, 242, 243 and 244 and are provided as inputs to the Overload Sequence Control and Position Used Circuit 21.

Figure 14:
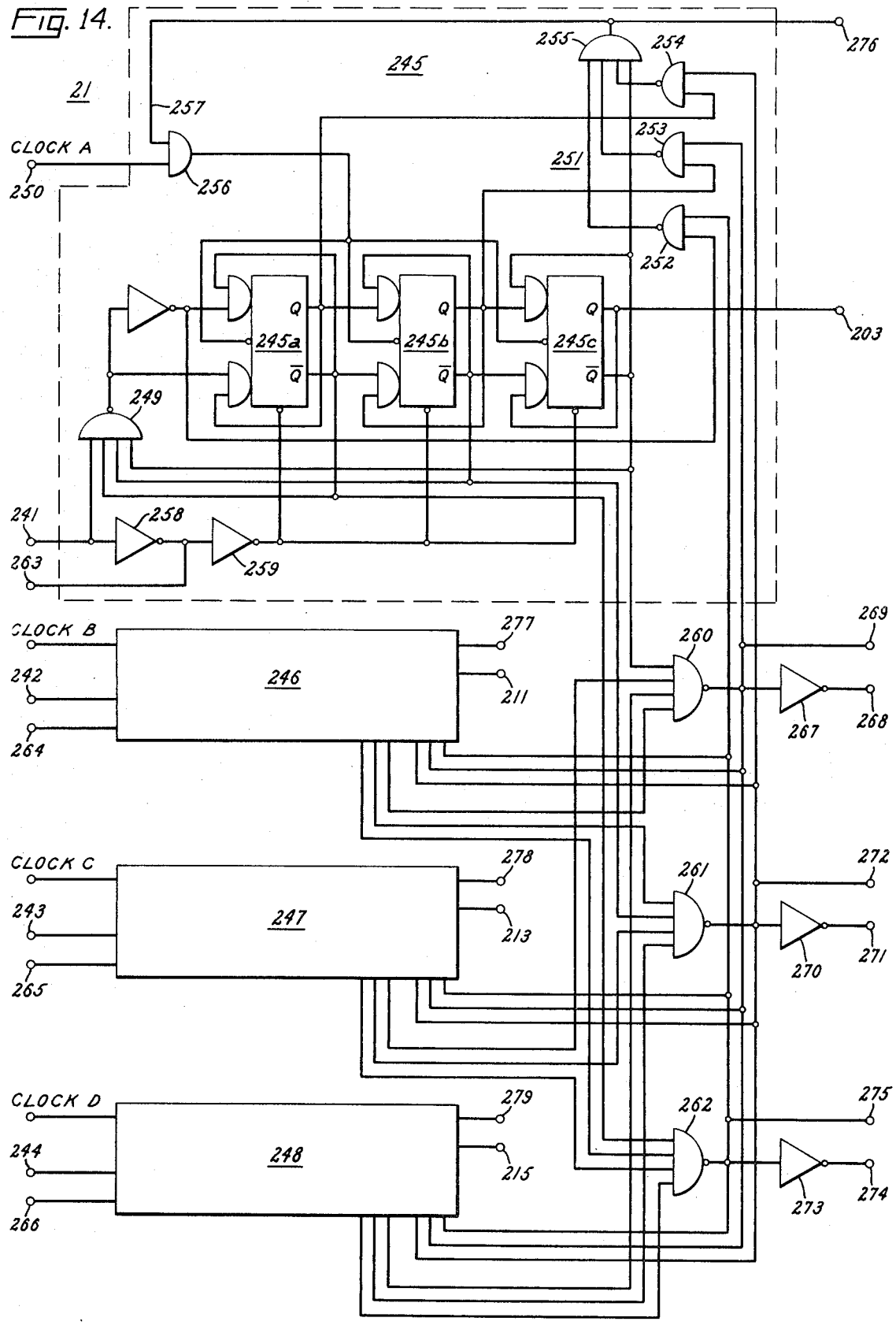
FIG. 14 is a schematic diagram of the Overload Sequence Control and Position Used Circuit 21 shown in FIG. 2.

The details of the Overload Sequence Control and Position Used Circuit 21 are shown in FIG. 14.

As was previously noted the function of circuit 21 is to store the information as to the order that the rectifier units entered into "in range" operation.

As can be seen circuit 21 includes four identical subcircuits 245, 246, 247 and 248. Each subcircuit includes a shift register. The shift register of subcircuit 245 includes three serially connected flip-flops, namely, 245a, 245b and 245c. Flip-flop 245a, the first flip-flop in the register, establishes what I define as shift register position three, flip-flop 245b establishes shift register position 2 and flip-flop 245c establishes shift register position 1. The flip-flops are arranged such that an input signal, once clocked into the first flip-flop of the register, will appear at its Q output and will, upon the occurrence of subsequent clock pulses, shift from position to position until it either reaches Q output of the registers' last stage flip-flop (i.e., the first position) or is precluded from further shifting by the action of additional logic circuitry.

In order to ensure that only one flip-flop of the shift register has its Q output at the binary "1" level at any one time a four input NAND gate 249 is provided with three of its inputs coupled to the $\overline{Q}$ outputs of flip-flops 245a, 245b and 245c, respectively, and with its fourth input coupled to input terminal 241 (the $\overline{Q}$ output of Overload Decoder flip-flop 225).

The source of clock pulses for subcircuit 245 is not shown but is coupled to terminal 250 and is denoted as clock A.

Clock pulses are provided to the shift register of subcircuit 246 from means (not shown) denoted as clock B. These pulses are displaced slightly lagging in time with respect to the pulses from clock A. Clock pulses are provided to the shift register of subcircuit 247 for means (not shown) denoted as clock C. These pulses are displaced slightly lagging in time with respect to the pulses from clock B. Clock pulses are provided to the shift register of subcircuit 248 from means (not shown) denoted as clock D. These pulses are displaced slightly lagging in time with respect to the pulses from clock C.

Assuming that all subcircuit flip-flops are clear, operation of the shift register is as follows: upon receipt of the first clock pulse at terminal 250 and a binary "1" signal at input terminal 241, the Q output of flip-flop 245a will switch to the binary "1" level (i.e., position three will be "filled"). At the occurrence of the next clock pulse at terminal 250 the Q output of flip-flop 245b will switch to the binary "1" level (i.e., position two will be filled) and the action of NAND gate 249 will result in the Q output of flip-flop 245a switching to the binary "0" level. At the occurrence of the next clock pulse at terminal 250 the Q output of flip-flop 245c will switch to the binary "1" level (i.e., position one will be filled) and the action of NAND gate 249 will result in the Q output of flip-flop 245b switching to the binary "0" level and the Q output of flip-flop 245a remaining at the binary "0" level.

The Q output of flip-flop 245c is provided at terminal 203 (an input to the High-Low Switch 16).

As can be seen subcircuit 245 includes additional logic circuitry 251 which is adapted for providing a signal to suppress the clock pulses, via the production of a binary "0" signal, upon the occurrence of the filling of position one or upon the occurrence of the filling of a position immediately preceding a position already filled in some other shift register. To that end logic circuit 251 includes NAND gates 252, 253, 254 and AND gate 255. NAND gate 253 is associated with position one, NAND gate 254 is associated with position two and NAND gate 252 is associated with position three.

The clock A pulses are provided to one input of a two input AND gate 256. As should be appreciated if the input 257 of the AND gate 256 is at the binary "0" level, the passage of clock pulses to the shift register will be precluded.

Each subcircuit also includes means enabling the direct clearing of the shift registers. To that end a pair of inverters 258 and 259 are coupled to the direct clearing terminals of flip-flops 245a, 245b and 245c and to input terminal 241.

Circuit 21 also includes what can be called "position used" circuitry. That circuitry includes NAND gate 260, 261 and 262. The gate 260 provides a signal indicating if the first position of any flip-flop is filled. The gate 261 provides a signal indicating if the second position of any flip-flop is filled. The gate 262 provides a signal indicating if the third position of any flip-flop is filled. To that end the $\overline{Q}$ outputs of the first position flip-flops are connected as inputs to NAND gate 260, the $\overline{Q}$ outputs of the second position flip-flops are connected as inputs to NAND gate 261 and the $\overline{Q}$ outputs of the third position flip-flops are connected as inputs to NAND gate 262.

The position used circuitry is operative for monitoring the state of the shift register flip-flops and for preventing the same position in all other shift registers to fill once it fills one register. For example, assuming that the first position in subcircuit 246 fills first, its clock will be suppressed by the binary "0" signal appearing on its position one $\overline{Q}$ output. As should be appreciated the output of the $\overline{Q}$ of its position one will be at the binary "0" level whereupon the output of NAND gate 260 will become binary "1". This binary "1" output will appear at NAND gate 253 of subcircuit 245 and the corresponding NAND gate of the other subcircuits. If the other input to NAND gate 253 is also at the binary "1" level, the output thereof will be at the binary "0" level which will cause the AND gate 256 to provide a binary "0" signal output. The latter output effects the suppression of the clock signals for subcircuit 245. This action will occur assuming that position two in subcircuit 245 fills after position one in subcircuit 246 fills since the Q output of flip-flop 245b will switch to the binary "1" level at that time, whereupon the binary "1" signal on the Q output of flip-flop 245b will remain.

The first position output of subcircuits 246, 247 and 248 is provided at terminals 211, 213, 215, respectively. These terminals are inputs to the High-Low Switch 16. Each subcircuit includes one output terminal utilized for providing a signal to the Overload Auxiliary Circuit 23 whenever a shift register is cleared directly.

For example, subcircuit 245 includes clear output terminal 263, subcircuit 246 includes clear output terminal 264, subcircuit 247 includes clear output terminal 265 and subcircuit 248 includes clear output terminal 266.

As should be appreciated the flip-flops in any subcircuit will be cleared if its input terminal receives a binary "0" signal (indicative of the existence of an overloaded rectifier unit). For example, if input terminal 241 is at the binary "0" level (indicative of the fact that rectifier 1d is overloaded), series inverters 258 and 259 will pass that signal to the direct clear inputs of flip-flops 245a, 245b and 245, whereupon they will be cleared.

The output of NAND gate 260 is inverted by inverter 267 and is provided at a terminal 268. A direct NAND gate output is provided by terminal 269. In a similar manner the output of NAND gate 261 is inverted by inverter 270 and provided at terminal 271. A direct NAND gate output is provided by terminal 272. The output of NAND gate 262 is inverted by inverter 273 and is provided at terminal 274. A direct NAND gate output is provide by terminal 275.

Each subcircuit also includes a terminal at which a clock suppression signal appears when the clock is suppressed. For example, terminal 276 is the clock suppression terminal for subcircuit 245. In a similar manner subcircuits 246, 247 and 248 include clock suppression terminals 277, 278 and 279, respectively.

Figure 15:
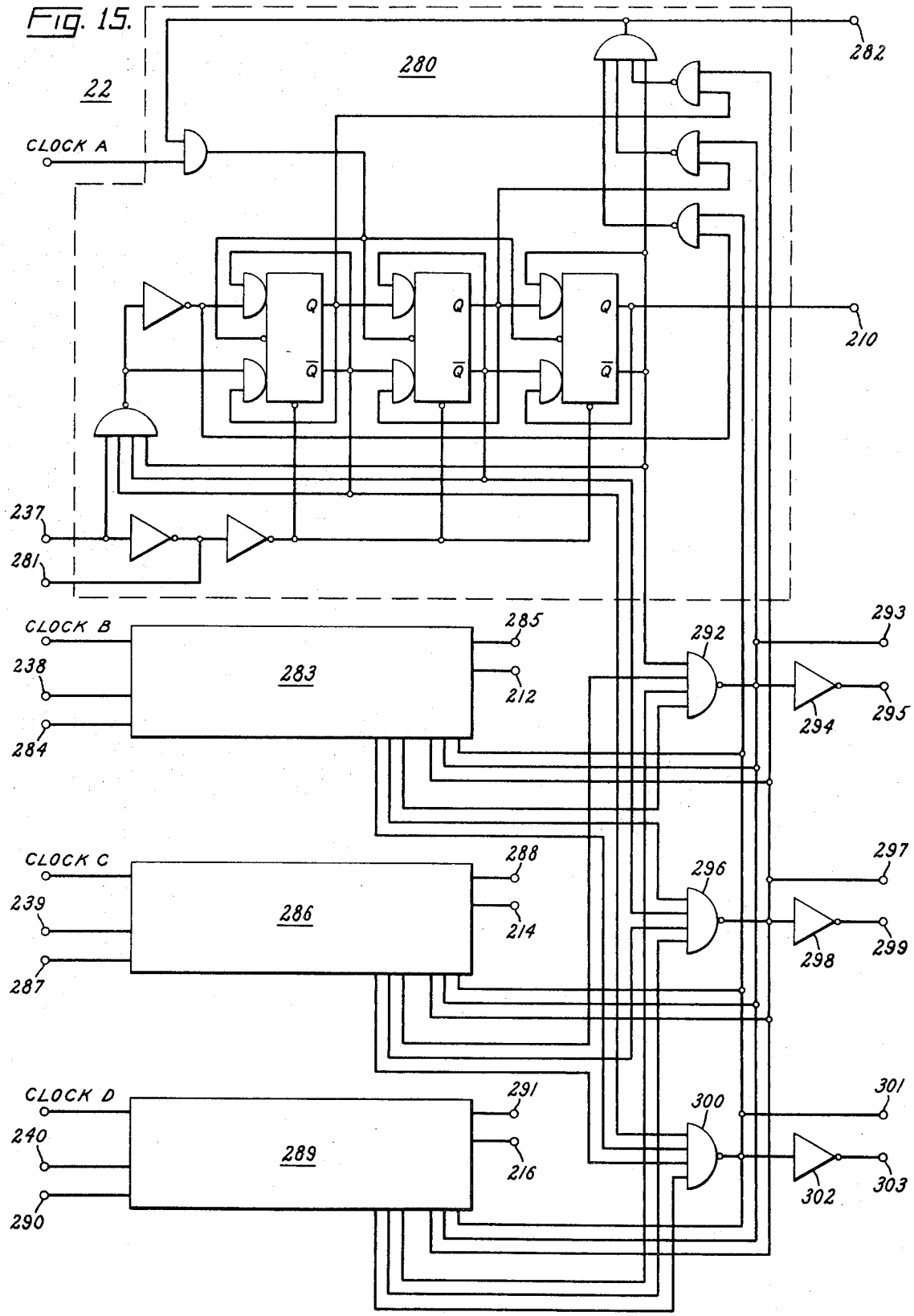
FIG. 15 is a schematic diagram of the Overload Sequence Control and Position Used Circuit 22 shown in FIG. 2.

The Overload Sequence Control and Position Used Circuit 22 is of identical construction as circuit 21 and is shown schematically in FIG. 15. This circuit operates to store information as to the order that the rectifier units become overloaded. To that end subcircuit 280 stores the information relating to unit 1d and includes input terminal 237, clear output terminal 281, position one output terminal 210 (an input to the high low switch) and clock suppression terminal 282. Subcircuit 283 includes input terminal 238, clear output terminal 284, position one output terminal 212 (an input to the high-low switch) and clock suppression terminal 285. Subcircuit 286 includes input terminal 239, clear output terminal 287, position one output terminal 214 (an input to the high-low switch) and clock suppression terminal 288. Subcircuit 289 includes input terminal 240, clear output terminal 290, position one output terminal 216 (an input to the high-low switch) and clock suppression terminal 291.

NAND gate 292 provides the information relating to position one directly as terminal 293. An inverter 294 inverts the NAND gate output and provides it at terminal 295.

NAND gate 296 provides the information relating to position two directly at terminal 297. An inverter 298 inverts the NAND gate output and provides it at terminal 299.

NAND gate 300 provides the information relating to position three directly at terminal 301. An inverter 302 inverts the NAND gate output and provides it at terminal 303.

Details of the Overload Auxiliary Circuit 23 are shown in FIG. 16. As can be seen therein circuit 23 includes two subcircuits 304 and 305. Subcircuit 304 is adapted for providing a binary "1" signal at its output terminal 205, if any unit is overloaded. To that end, the subcircuit includes a two input AND gate 306. One input to the AND gate is provided by a clock pulse source (not shown) and the other input thereto is provided by terminal 234 of the Overload Decoder 20. The output of the AND gate 306 is connected to the clock input of a J-K flip-flop 307. An inverter 308 is connected between the J and K inputs thereof to form a data latch input arrangement coupled from a positive source of voltage at terminal 309.

Operation of circuit 304 is as follows: if any unit is overloaded a binary "1" signal appears at terminal 234. The coincidence of a clock pulse and a binary "1" input signal, clocks flip-flop 307, whereupon its Q output at terminal 205 switches to the binary "1" level. The terminal 205 serves as an input of the High-Low Switch 16 and upon receipt of a binary "1" signal, the switch enables "sequence basis" signals from the overload sequence control circuits 21 and 22 to pass therethrough.

Due to the nature of the J-K flip-flop 307 and the input arrangement it would remain in the state wherein its Q output is at the binary "1" level even though all of the rectifier units may return to "in range" operation. If such were the case regulation on a "current basis" could not be reestablished.

To prevent such an operation the flip-flop has associated therewith circuitry which will clear it when the Up-Down Counter Circuit 9 produces a "lower" signal, if all the units are "in range". That circuit includes an inverter 310 connected to terminal 234. The output of inverter 310 forms one input of a NAND gate 311, i.e., input 311a. The other input, denoted as 311b, to the NAND gate is provided from a pulse forming circuit connected to terminal 79 of the Raise-Lower Decoder Circuit 8. The pulse forming circuit is adapted for providing a very short output pulse in response to a binary "0" signal. As should be appreciated, if all units are operating "in range" a binary "0" signal will appear at terminal 234 whereupon a binary "1" signal will be applied to the input 311a of NAND gate 311. If the Raise-Lower Decoder determines that a unit is to be lowered, the signal appearing on its terminal 79 will be binary "0". This will result in input 311a of the NAND gate switching to the binary "1" level whereupon a binary "0" signal will be supplied at direct clear terminal of flip-flop 307 to clear it.

Subcircuit 305 includes plural inverters and gates and is provided to prevent any unwanted interactions between regulator circuits during the very short period of time that the shift registers in the Overload Sequence Control and Position Used Circuits 21 and 22 are in process of filling. As can be seen, an inverter 313 is connected to clock suppression terminal 263 of the control circuit 21. The output of this inverter is provided as an input to a 2-input NAND gate 314. The other input of the NAND gate is provided by the clear output terminal 276 of the control circuit 21. Inverter 313 and NAND gate 314 from sub-subcircuit 315 whose output is provided by the NAND gate as an input to NAND gate 316. Similar sub-subcircuits are included in subcircuit 305, for example, sub-subcircuit 317 includes inverter 318 and NAND gate 319, sub-subcircuit 320 includes inverter 321 and NAND gate 322, sub-subcircuit 323 includes inverter 324 and NAND gate 325, sub-subcircuit 326 includes inverter 327 and NAND gate 328, sub-subcircuit 329 includes inverter 330 and NAND gate 331, sub-subcircuit 332 includes inverter 333 and NAND gate 334, and sub-subcircuit 335 includes inverter 336 and NAND gate 337.

The output of NAND gate 316 is provided as one input, 338, to a 2-input NAND gate 339. The other input to this NAND gate is provided via an inverter 340 connected to terminal 85 of the Up-Down Counter Circuit 9.

The output of NAND gate 339 is denoted as terminal 340 and is utilized to suppress the clock pulse sources for all of the regulator circuits except the clocks A, B, C and D of the overload sequence control circuits 21 and 22.

Figure 17:
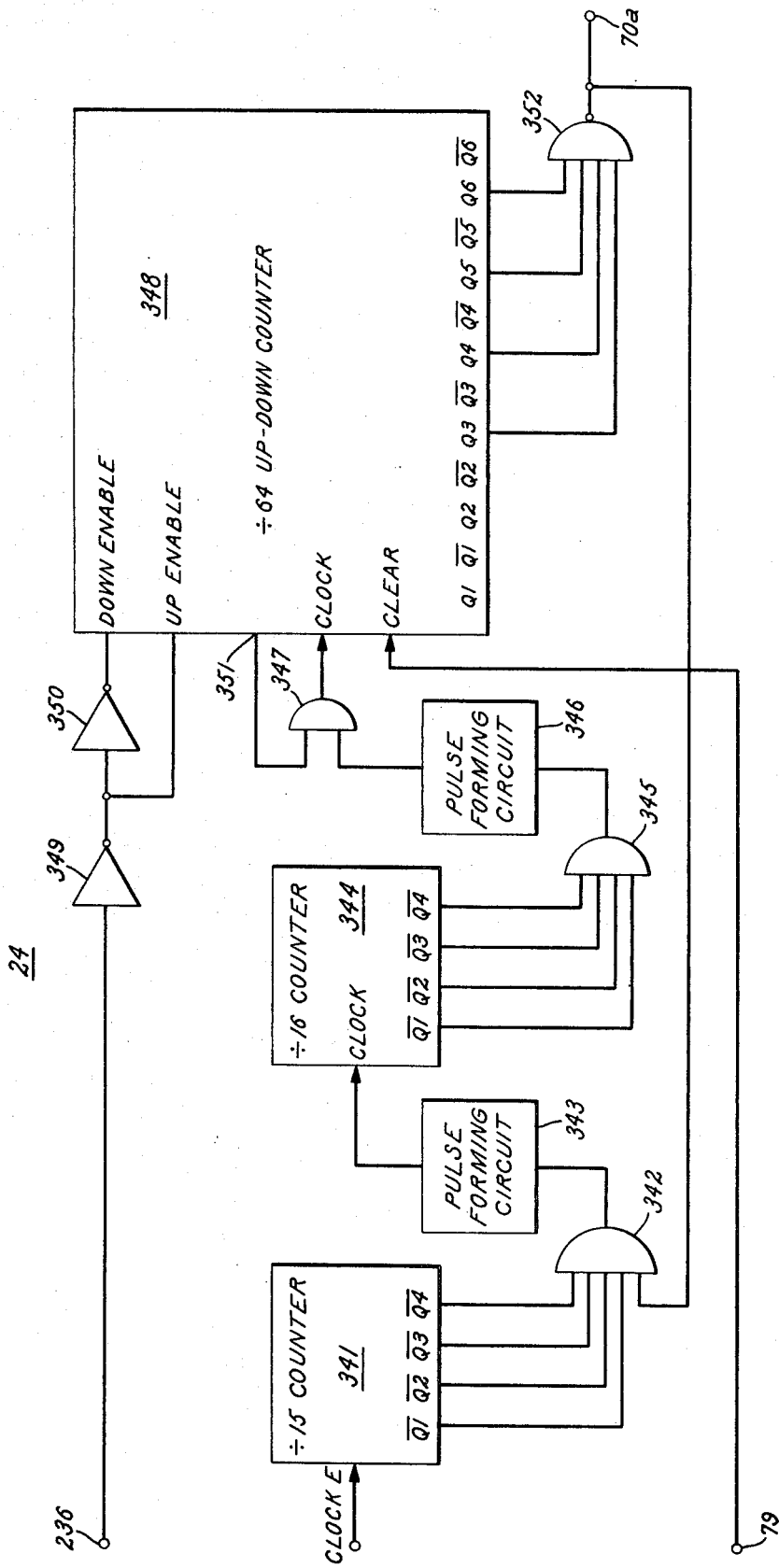
FIG. 17 is a schematic diagram of the Timer 24 shown in FIG. 2.

The details of the Timer Circuit 24 are shown in FIG. 17. As was previously noted the timer circuit commences counting clock pulses in response to a signal from the overload decoder indicating that any rectifier unit is overloaded. After counting clock pulses for approximately 1 hour the timer circuit provides a binary "0" signal at its output, which signal is utilized to initiate the lowering of the output current of the overloaded unit.

As can be seen the timer 24 includes a free-running divide-by-15 counter 341, a five-input AND gate 342, four of whose inputs are provided by the $\overline{Q}$ outputs of the counter. The counter 341 receives clock pulses at a repetition rate of one per quarter of a second from a clock pulse source E (not shown).

As should be appreciated the output of AND gate 342 will be a binary "1" signal once each approximately 3 ¾ of a second. The output of AND gate 342 is fed into a pulse forming circuit 343 to provide a relatively short output pulse at the occurrence of each binary "1" signal. The pulse output of circuit 343 serves to clock a divided-by-16 counter 344. The $\overline{Q}$ outputs of counter 344 are fed as inputs to an AND gate 345 whose output is in turn fed into a pulse forming circuit 346 like that of circuit 343.

As should be appreciated the output of pulse forming circuit 346 is a train of short duration pulses at a repetition rate of one per approximately 1 minute. These pulses are provided at one input to an AND gate 347 controlling the clock input to a divide-by-64, up-down counter 348.

The counter 348 is adapted to count up to predetermined time-out point (001111) in response to a binary "1" signal at its "up-enable" terminal and to count down to predetermined time-out point (000000) in response to a binary "1" signal at its "down-enable" terminal.

The up-enable signal is provided whenever any rectifier unit is overloaded whereas the down-enable signal is provided when all units are "in range". To that end an inverter 349 is connected between the terminal 236 of the Overload Decoder Circuit 20 and the "up-enable" input to counter 348. An inverter 350 is connected between the output of inverter 349 and the "-down-enable" terminal of the counter 348.

The counter includes an output terminal 351 which is at the binary "0" level whenever the counter, in counting up, reaches the binary 001111 state or whenever the counter, in counting down, reaches the binary 000000 state. This binary "0" signal is provided as the second input to AND gate 347 and serves to suppress the clock pulses from circuit 346. This function is provided in order to lock the counter at its upper time-out point until the counter is cleared when the counter reaches that point and to lock the counter at its lower time-out point when that point is reached (so long as all rectifier units remain "in range").

The upper time-out point is established by providing the Q3, Q4, Q5 and Q6 outputs of the counter (i.e., the Q outputs of the counter's last four stages) as inputs to a NAND gate 352.

The output of NAND gate 352 is provided to terminal 70a of the Raise-Lower Decoder 8. The output of NAND gate 352 also is provided as the fifth input to AND gate 342, whereupon when counter 348 reaches the upper time-out point the input to pulse forming circuit 343 is blocked so that counter 344 ceases counting.

The counter 348 includes a direct clear terminal, which upon the presence of a binary "0" signal thereat results in the clearing of the counter. The direct clear terminal is connected to terminal 79 of the Up-Down Counter Circuit 9.

Operation of the timer circuit 24 is as follows: pulses at a repetition rate of one per approximately one minute are provided at the clock input of counter 348 via AND gate 347. If all of the units are "in-range" a binary "1" signal will appear at terminal 236 and will be provided via inverters 349 and 350 to the down enable terminal of the counter, whereupon the counter will begin counting down to its lower time-out point. Upon reaching that point output terminal 351 of the counter will be at the binary "0" level, thereby causing AND gate 347 to block the passage of pulses from circuit 346 to the counter's clock input terminal. Irrespective of whether or not the counter is at its lower time-out point, if a rectifier unit becomes overloaded a binary "0" signal will appear at terminal 236. This signal is inverted by inverter 349 which results in the counter's commencing to count up from the point it reached in counting down. When the counter reaches its upper time-out point a binary "0" is provided by output NAND gate 352 which effects the suppression of signals to pulse forming circuit 343. At essentially the same time a binary "0" signal is provided at output terminal 351 of counter 348 which causes AND gate 347 to block the further passage of pulses to the clock input of the counter.

The output of NAND gate 352 which is provided at terminal 70a of the Raise-Lower Decoder causes that decoder to provide a "lower signal" to the Up-Down Counter 71 of Circuit 9 (which results in its counting down to its lower time-out point). Upon reaching the lower time-out point, a binary "0" signal is provided by the counter 71 at terminal 79. This signal results in the direct clearing of the Up-Down Counter 348.

Figure 18:
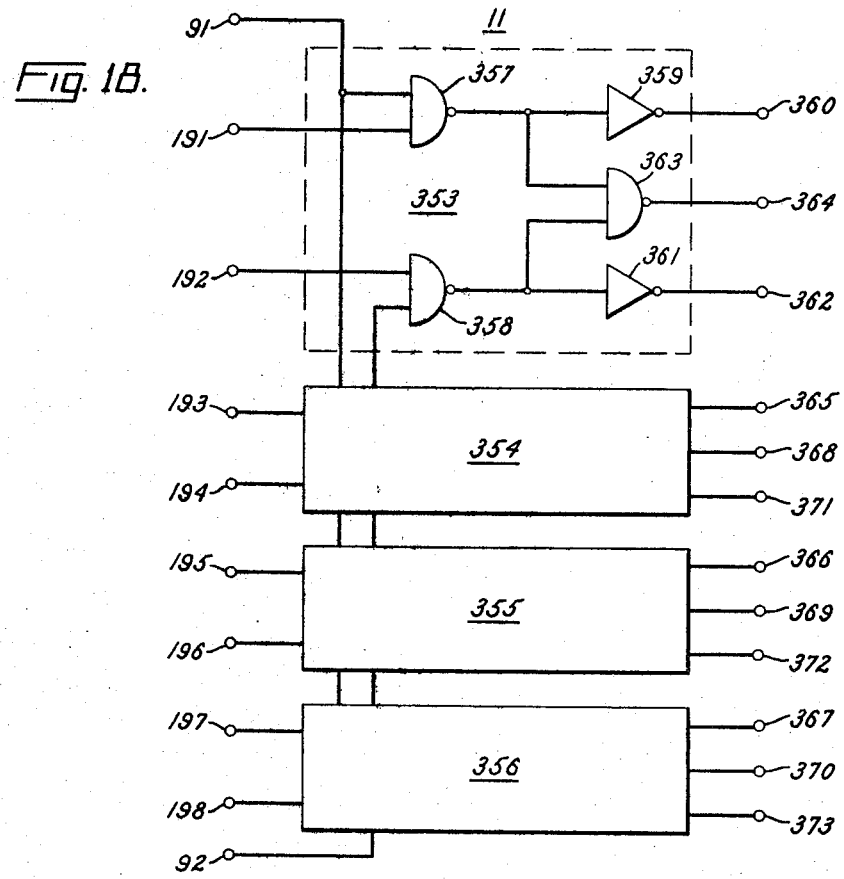
FIG. 18 is a schematic diagram of the Raise-Lower Activate Circuit shown in FIG. 2.

The details of the Raise-Lower Activate Circuit 11 are shown in FIG. 18.

As was previously noted the Raise-Lower Activate Circuit receives binary signals from the High-Low Switch. The binary signals are either "current basis" signals or "sequence basis" signals depending upon whether or not any unit is overloaded. If all units are operating "in range", "current basis" signals indicating which rectifier unit is providing the most current and which rectifier unit is supplying the least current are supplied to the activate circuit 11. If at least one unit is overloaded, sequence basis signals indicating which unit has been overloaded the longest and which unit has been operating in range the longest immediately preceding period of time are supplied to the activate circuit 11.

The current basis or sequence basis signals are combined in the activate circuit 11 with either a "raise" or a "lower" pulse from the raise-lower pulse circuit 10 in order to provide a binary output signal which will effect the change desired.

As can be seen activate circuit 11 includes four identical subcircuits 353, 354, 355, 356. Each subcircuit includes one input terminal 91 at which "raise" pulses from the Raise-Lower Pulse Generator Circuit 10 are provided and a second input terminal 92 at which "lower" pulses are provided therefrom. In addition subcircuit 353 includes two other input terminals, one terminal, 191, being the output terminal of switch 16 which carries the information as to whether or not rectifier unit 1d is low (i.e., providing the least current or operating "in range" for the longest immediately preceding period of time) and the other terminal, 192, being the output terminal of switch 16 which carries the information as to whether or not rectifier unit 1d is high (i.e. providing the most current or operating overloaded for the longest immediately preceding period of time).

Subcircuit 354 includes terminals 193 and 194 at which corresponding information regarding unit 2d is provided, subcircuit 355 includes terminals 195 and 196 at which corresponding information regarding unit 3d is provided, and subcircuit 356 includes terminals 197 and 198 at which corresponding information regarding unit 4d is provided.

Each subcircuit includes three output terminals, one terminal being the "raise" terminal, another being the "change" terminal and the third being the "lower" terminal. A binary "1" signal appearing on the raise terminal of any subcircuit indicates that the rectifier unit associated with that subcircuit is to have its voltage raised. A binary "1" signal appearing on the lower terminal of any subcircuit indicates that the rectifier unit associated with that subcircuit is to have its voltage lowered. Any time the raise or the lower terminal of any subcircuit is at the binary "1" level, the "change" terminal thereof will also be at the binary "1" level.

The "raise" and "lower" output terminals serve as inputs to the Tap Changer Activate and Relay Circuit 17 and the "change" output terminals serve as inputs to the Magnetic Amplifier Activate and Relay Circuit 18.

As can be seen subcircuit 353 includes a NAND gate 357 having two inputs, one input being provided by terminal 91 (the raise pulse terminal of the Raise-Lower Pulse Circuit 10) and the other input being provided by terminal 191 (the unit 1d "low" terminal of the High-Low Switch 16). A second, two-input NAND gate is provided with one input thereto provided by terminal 92 (the lower pulse terminal of the pulse circuit 10) and the other input provided by terminal 192 (the unit 1d "high" terminal of the switch 16). The output of gate 357 is inverted by inverter 359 and provided at output terminal 360. Terminal 360 forms the "raise" terminal of the subcircuit. In a similar manner the output of gate 358 is inverted by inverter 361 and provided at output terminal 362. Terminal 362 forms the "lower" terminal of the subcircuit.

The output of gate 357 is provided as one input to NAND gate 363. The other input to this gate is provided from the output of gate 358. The output of NAND gate 363 is provided at terminal 364 and forms the "change" terminal of the subcircuit.

The raise terminals for subcircuits 354, 355 and 356 are terminals 365, 366 and 367, respectively. The "change" terminals for subcircuits 354, 355 and 356 are terminals 368, 369 and 370, respectively, and the "lower" terminals for subcircuits 354, 355 and 356 are terminals 371, 372 and 373, respectively.

Operation of subcircuit 353 is as follows: assuming that unit 1d has been operating overloaded for the past hour, a "lower" pulse will be provided at terminal 92. A binary "1" signal will appear at terminal 192 indicating that unit 1d is "high". The "lower" pulse and the binary "1" signal are supplied to the NAND gate 358 whereupon its output switches to the binary "0" level. The output of gate 358 is inverted to provide a binary "1" signal at the "lower" terminal (i.e. terminal 362) of the subcircuit. The binary "0" output of gate 358 causes the output of NAND gate 363 to switch to the binary "1" level whereupon the binary "1" signal also appears at "change" terminal 364.

Figure 19:
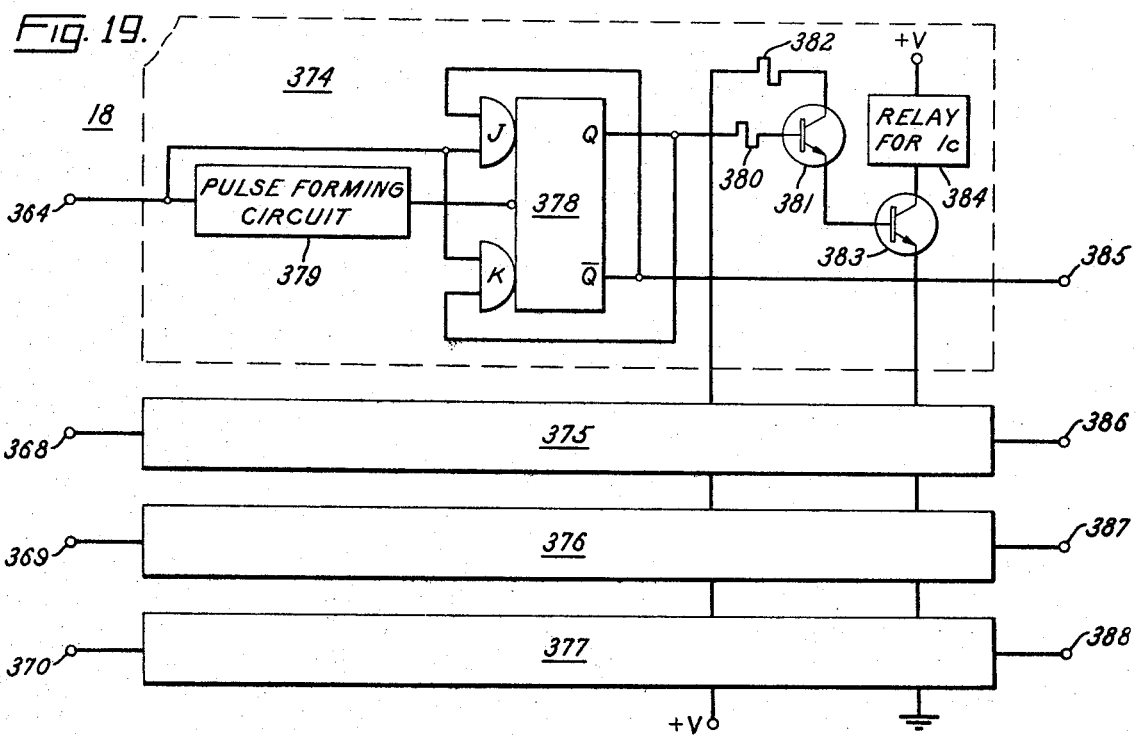
FIG. 19 is a schematic diagram of the Magnetic Amplifier Activate and Relay Circuit 18 shown in FIG. 2.

The details of the Magnetic Amplifier Activate and Relay Circuit 18 are shown in FIG. 19.

As was previously noted the magnetic amplifier activate circuit is adapted for changing the state of the magnetic amplifier in response to a change signal from the Raise-Lower Activate Circuit 11.

As can be seen, the magnetic amplifier activate circuit 18 includes four identical subcircuits, 374, 375, 376 and 377. Each subcircuit is arranged to change the state of a relay included therein in response to the presence of a change signal at its input terminal. The relay is arranged such that when energized the magnetic amplifier with which is is associated is energized or saturated.

Subcircuit 374 includes a J-K flip-flop 378 whose J and K terminals are directly connected to input terminal 364. A pulse forming circuit 379 is connected between input terminal 364 and the clock input of the flip-flop and provides a clock pulse thereto upon the presence of a binary "1" (i.e. "change" signal) at the input terminal 364. As should be appreciated since the J and K terminals are both directly connected to input terminal 364, each time that a binary "1" signal appears at terminal 364 the Q and $\overline{Q}$ outputs of the flip-flop will change state.

The Q output of flip-flop 378 is provided via a current limiting resistor 380 to the base of a transistor 381. The collector of transistor 381 is connected via a current limiting resistor to a source of positive voltage +V. The emitter of transistor 381 is connected to the base of a second transistor 383. The emitter of transistor 383 is grounded. A relay 384 is connected between the collector of transistor 383 and a source of positive voltage +V.

Operation of the subcircuit 374 is as follows: assuming that a "change" (binary "1") signal appears at terminal 364. If the flip-flop was previously in the state wherein its Q output was at the binary "0" level, upon the provision of the pulse formed from the binary "1" input by the pulse forming circuit 379 the flip-flop would change states (its Q output would be at the binary "1" level). This action would result in transistor 381 becoming conductive thereby initiating conduction of transistor 383. Once transistor 383 begins conducting, relay 384 energizes and picks up whereupon magnetic amplifier 1c saturates. If, however, flip-flop 378 was previously in the state wherein its Q output was at the binary "1" level, upon being clocked by the pulse from circuit 379 and the binary "1" input on terminal 364 results in the Q output of the flip-flop switching to the binary "0" level, whereupon both transistors 381 and 383 cease conducting. The non-conduction of transistor 383 causes relay 384 to be deenergized whereupon magnetic amplifier 1c unsaturates.

The $\overline{Q}$ output of flip-flop 378 is provided at terminal 385. This terminal forms one input to the Tap Changer Activate and Relay Circuit 17.

In a similar manner the $\overline{Q}$ output of the flip-flop in subcircuit 375 is provided at terminal 386, the $\overline{Q}$ output of the flip-flop in subcircuit 376 is provided at terminal 387 and the $\overline{Q}$ output of the flip-flop in subcircuit 377 is provided at terminal 388. Terminals 386, 387 and 388 form other input terminals to the Tap Changer Activate and Relay Circuit 17.

Figure 20:
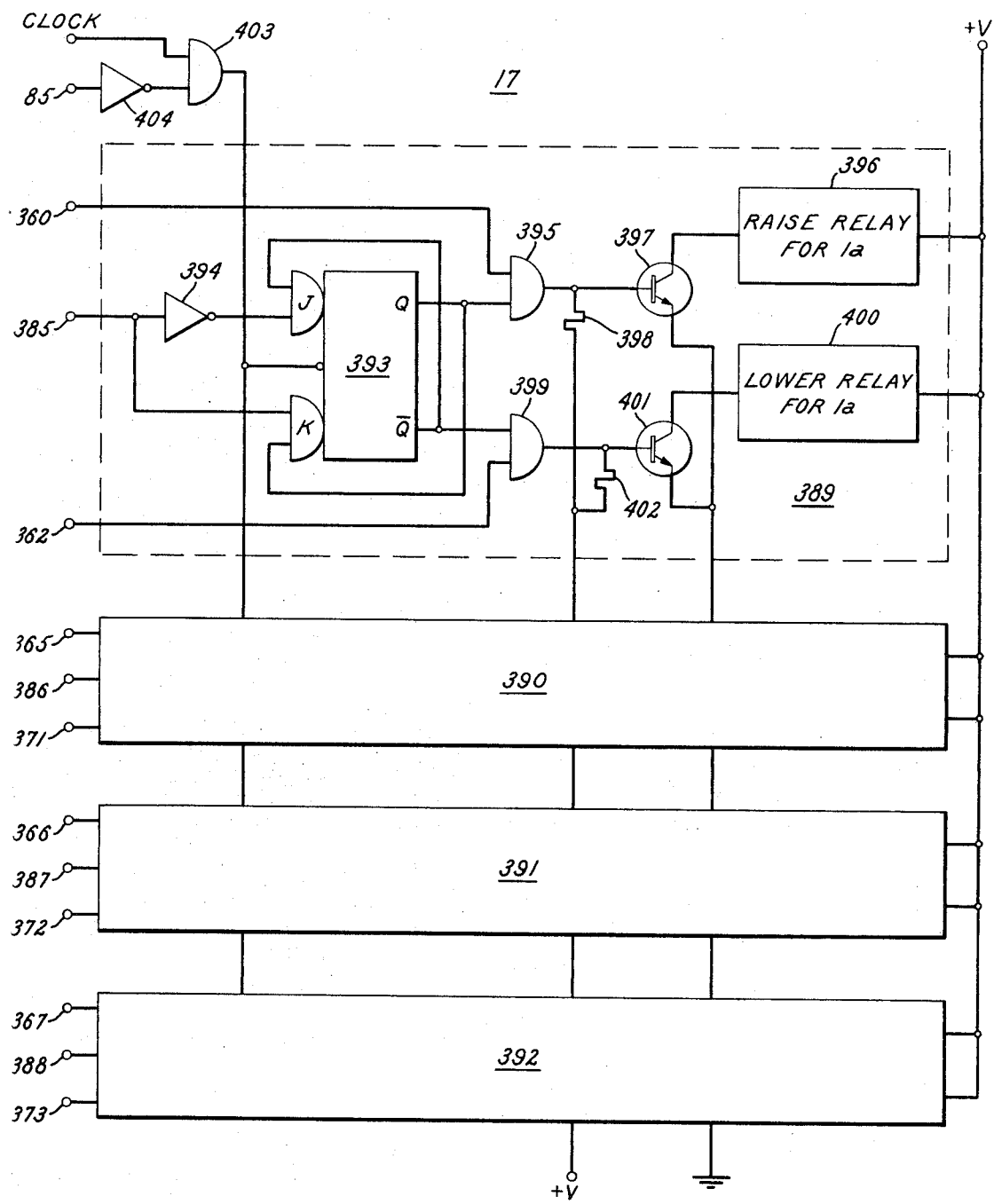
FIG. 20 is a schematic diagram of the Tap Changer Activate and Relay Circuit 17 shown in FIG. 2.

The details of the Tap Changer Activate and Relay Circuit 17 are shown in FIG. 20. As can be seen, circuit 17 includes four identical subcircuits 389, 390, 391 and 392. Subcircuit 389 includes a J-K flip-flop 393 whose J and K input terminals are arranged as a data latch via inverter 394. The input to the inverter is provided by terminal 385 which is the $\overline{Q}$ output of flip-flop 378 in the Magnetic Amplifier Activate and Relay Circuit 18.

The Q output of flip-flop 393 is provide as one input to AND gate 395. Another input thereto is provided by terminal 360 of the Raise-Lower Activate Circuit 11. The output of gate 395 is utilized to control the state of a relay 396 which, when energized, raises the tap setting of the tap changer of transformer 1a by one step. To that end the output of gate 395 is connected to the base of a transistor 397. The base of that transistor is also connected to a positive voltage source +V via a resistor 398. Resistor 398 serves to provide additional drive current for the transistor. The emitter of transistor 397 is connected to ground. The relay 396 is connected between the collector of transistor 397 and a source of positive voltage +V.

The $\overline{Q}$ output of flip-flop 393 is provided as one input to AND gate 399. Another input thereto is provided by terminal 362 of the Raise-Lower Activate Circuit 11. The output of gate 399 is utilized to control the state of a relay, 400, which when energized, lowers the tap setting of the tap changer of transformer 1a by one step. To that end the output of gate 399 is connected to the base of a transistor 401. The base of transistor 401 is also connected to the positive source of voltage +V via resistor 402. This resistor serves the same function as does resistor 398. The relay 400 is connected between the source of positive voltage +V and the collector of transistor 401.

Clock pulses (from a source not shown) are provided to the clock input of flip-flop 393 via one input of a two input AND gate 403. The other input of the AND gate is provided via an inverter 404 from terminal 85 of the Up-Down Counter Circuit 9. As should be appreciated whenever terminal 85 is at the binary "1" level, the flip-flop of activate circuit 17 will not receive clock pulses due to the blocking action of gate 403.

As can be seen subcircuit 390 has as its input terminals, terminals 365 and 371 of the Raise-Lower Activate Circuit 11 and terminal 386 of the Magnetic Amplifier Activate and Relay Circuit 18. In a similar manner subcircuit 391 includes input terminals 366 and 372 of circuit 11 and terminal 387 of circuit 18 and subcircuit 392 includes input terminals 367 and 373 of circuit 11 and terminal 388 of circuit 18.

Operation of Tap Changer Activate Circuit 17 can best be understood with reference to FIGS. 18, 19 and 20 and with regard to the following two examples. In the first example it shall be assumed that unit 1d is to have its voltage raised and that the magnetic amplifier 1c is in its saturated state. In the second example it shall be assumed that unit 1d is to have its voltage raised and that magnetic amplifier 1c is unsaturated.

Insofar as the first example is concerned, immediately before a binary "1" (raise) signal appears on terminal 360 (indicating that the voltage of unit 1d is to be raised), a binary "0" signal will appear at terminal 85 of the Up-Down Counter Circuit 9. Since the magnetic amplifier is saturated the Q output of flip-flop 378 will be at the binary "1" level and the $\overline{Q}$ output thereof at terminal 385 will be at the binary "0" level. The binary "0" signal at terminal 385 is inverted by inverter 394 and provided at the J input to flip-flop 393. Since terminal 85 is at the binary "0" level a clock pulse will be provided, via gate 403, to flip-flop 393 whereupon the Q output thereof will be at the binary "1" level. The binary "0" signal appearing on terminal 360 results in the output of AND gate 395 being at the binary "0" level notwithstanding the binary "1" signal from the Q output of flip-flop 393 is at the binary "0" level transistor 397 will be off and relay 396 deenergized.

At the occurrence of a binary "1" signal at terminal 360, a binary "1" signal will appear at terminal 85 and a binary "1" signal will appear at terminal 364.

The binary "1" signal at terminal 364 will cause the Q output of flip-flop 378 to switch to the binary "0" level whereupon transistors 381 and 383 will turn off and relay 384 will be deenergized. This action results in the desaturation of magnetic amplifier 1c.

The $\overline{Q}$ output of flip-flop 378, as provided by terminal 385, will be at the binary "1" level, whereupon the J input to flip-flop 393 of circuit 17 will be provided with a binary "0" signal. Nevertheless, the output of the flip-flop will remain at the binary "1" level since the clock pulses were suppressed by the action of AND gate 403 in response to the binary "1" signal at terminal 85.

The binary "1" signal on the Q output of flip-flop 393 is provided as one input to AND gate 395. The other input to that gate is provided via terminal 360 and is also at the binary "1" level. Accordingly, the output of gate 395 will be at the binary "1" level whereupon transistor 397 will be rendered conductive, relay 396 will be energized and the tap setting of the tap changer of transformer 1a will be raised one step.

The combination of the desaturation of the magnetic amplifier and the one-step rise in the tap setting results in the voltage on rectifier unit 1d being raised by one half the voltage of a tap step.

Insofar as example two is concerned, immediately before a binary "1" (raise) signal appears on terminal 360, a binary "0" signal will appear on terminal 85 of the Up-Down Counter Circuit 9. Since the magnetic amplifier 1c is unsaturated the $\overline{Q}$ output of flip-flop 378 as provided by terminal 385 will be at the binary "1" level. This signal is inverted by inverter 394 to provide a binary "0" signal at the J terminal of flip-flop 393. Since the clock pulses to the flip-flop 393 are not suppressed (terminal 85 is at the binary "0" level) the Q output thereof will also be at the binary "0" level. This signal results in the output of AND gate 395 being at the binary "0" level, whereupon transistor 397 is "off" and the relay 396 is deenergized.

At the occurrence of a binary "1" signal at terminal 360, a binary "1" signal will appear at terminal 85 and a binary "1" signal will appear at terminal 364.

The binary "1" signal at terminal 364 will cause the Q output of flip-flop 378 to switch to the binary "1" level whereupon transistors 381 and 383 will turn on, relay 384 will be energized and the magnetic amplifier 1c will be saturated.

The $\overline{Q}$ output of flip-flop 378, as provided by terminal 385, will be at the binary "0" level whereupon the J input to flip-flop 393 will be at the binary "1" level. Nevertheless, the Q output of flip-flop 393 remains at the binary "0" level since the clock pulses are suppressed by the action of AND gate 403 in response to the binary "1" signal at terminal 85.

Since the Q output of flip-flop 393 is at the binary "0" level the output of NAND gate 395 will be at the binary "0" level notwithstanding the presence of a binary "1" (raise) signal at terminal 360. Accordingly, transistor 397 will remain off and relay 396 will remain deenergized, whereupon tap setting of the tap changer 1a will remain at its previous setting.

Operation of the circuit 17 in order to lower the voltage on any unit will proceed in an exactly opposite manner to the above-described raising operation.

It should be pointed out that all of the rectifier units in the current supply system shown in FIG. 1 need not be of the same rating. If rectifier units having different ratings are utilized my regulator can be modified so that "current basis" operation is effectuated by raising the voltage on the rectifier unit producing the smallest fraction of its rated current when a raise is required and by lowering the voltage on the rectifier unit producing the largest fraction of its rated current when a lower is required.

While I have shown and described a particular embodiment of my invention, it will be obvious to those skilled in the art that various changes and modifications may be made without departing from my invention in its broader aspects; and I, therefore, intend herein to cover all such changes and modifications as fall within the true spirit and scope of my invention.

What I claim as new and desire to secure by Letters Patent of the United States is:

1. In an electrical system comprising a plurality of parallel connected rectifier units for supplying current to a load, each of said units being connected to a separate rectifier transformer to supply a portion of the total load current the magnitude of which portion is a function of the voltage applied to that unit, each of said units being operative "in range" when supplying no more than a predetermined rated magnitude of current and being capable of "overloaded" operation in which condition more than said predetermined rated magnitude of current is supplied, the system further comprising voltage adjusting means for individually adjusting the voltage applied to each of said rectifier units and a regulator including means for monitoring the magnitude of current supplied to the load and means operative when all units are operating "in range" for causing said voltage adjusting means to raise the voltage on the rectifier unit which is providing the smallest fraction of its rated current if the magnitude of load current is below a preselected minimum level and for causing said voltage adjusting means to lower the voltage on the rectifier unit which is providing the largest fraction of its rated current if the magnitude of load current is above a preselected maximum level, improved means for minimizing overheating of any rectifier transformer in the event that its associated unit is operating "overloaded," said means comprising:

a. first means for individually detecting "overloaded" operation of the respective rectifier units;

b. second means responsive to said first means detecting an "overloaded" operation for determining the sequential order that said units began "overloaded" operation and for providing a first signal indicating which unit has been "overloaded" for the longest immediately preceding period of time; and c. third means responsive to said first signal and operative whenever a detected "overloaded" condition has continuously existed throughout a predetermined period of time for causing said voltage adjusting means to lower the voltage on whichever rectifier unit said first signal indicates has been "overloaded" for the longest immediately preceding period of time.

2. The electrical system as specified in claim 1 additionally comprising:

d. fourth means, coupled to said first means, for determining the sequential order that said units began "in range" operation and for providing a second signal indicating which unit has been "in range" for the longest immediately preceding period of time; and e. fifth means responsive to said third signal and operative for causing said voltage adjusting means to raise the voltage on the unit which said second signal indicates has been operating "in range" for the longest immediately preceding period of time if the level of load current drops below the preselected minimum level after the operation of said third means.

3. The electrical system as specified in claim 1 wherein said first means comprises:

i. fourth means for providing plural signals proportional to the magnitude of current supplied to the load; and ii. fifth means coupled to said fourth means for producing a set of second signals indicating which, if any, of said plural signals is greater than a predetermined value, said second signals being supplied to said second means which is operative to determine the sequential order that said second signals were produced.

4. The electrical system as specified in claim 3 wherein said second means comprises: storage means for receiving said second signals in sequential order and for providing said first signal indicating which unit has been continuously "overloaded" for the longest immediately preceding period of time.

5. The electrical system as specified in claim 4 wherein said fifth means also provides a third signal indicative of any of said plural signals being greater than said predetermined value, and wherein said third means comprises:

i. timer means adapted for producing a fourth signal in delayed response to said third signal; and ii. sixth means responsive to said first and fourth signal for causing said voltage adjusting means to lower the voltage on whichever unit said first signal indicates has been "overloaded" for the longest immediately preceding period of time.

6. The electrical system as specified in claim 5 additionally comprising:

d. seventh means, coupled to said first means, for determining the sequential order that said units begin "in range" operation and for providing a fifth signal indicating which unit has been "in range" for the longest immediately preceding period of time; and e. eighth means responsive to said fifth signal for causing said voltage adjusting means to raise the voltage on the unit which said fifth signal indicates has been operating "in range" for the longest immediately preceding period of time if the level of load current drops below the preselected minimum level after operation of said third means.

7. The electrical system as specified in claim 6 wherein said fifth means also provides a set of sixth signals indicating which of said plural signals is equal to or less than said predetermined value, and wherein said seventh means comprises storage means adapted for receiving said sixth signals in sequential order and for providing said fifth signal indicating which unit has been operating "in range" for the longest immediately preceding period of time.

8. The electrical system as specified in claim 7 wherein said eighth means comprises:

i. ninth means operative for monitoring the magnitude of load current and for providing a seventh signal when the magnitude of load current is below said preselected minimum; and ii. tenth means responsive to said fifth and said seventh signals for causing said voltage adjusting means to raise the voltage on whichever unit said fifth signal indicates has been operating "in range" for the longest immediately preceding period of time.

9. The electrical system as specified in claim 8 wherein said voltage adjusting means comprises an individual tap changer connected to each rectifier transformer and an individual magnetic amplifier connected to each rectifier unit.

10. A method for preventing damaging overheating of any one of a plurality of electric transformers which are respectively associated with a plurality of parallel-connected rectifier units supplying high-current to a load, wherein the magnitude of the portion of load current supplied by each rectifier unit is a function of the voltage applied thereto by its associated transformer, said transformer being overloaded when its associated rectifier unit is providing more than a predetermined rated current to the load, comprising the steps of:
a. separately monitoring the current provided by each rectifier unit to the load so as to indicate overload conditions;
b. keeping track of the history of the overload conditions among all of the rectifier units and indicating which rectifier unit has been providing more than the predetermined rated current for the longest immediately preceding period of time; and
c. automatically lowering the voltage on the rectifier unit indicated in step (b) whenever an overload condition has persisted for a predetermined period of time.

11. The method as specified in claim 1 additionally comprising the steps of:
d. indicating which rectifier unit has been providing equal or less than said predetermined rated current for the longest immediately preceding period of time;
e. determining if the magnitude of total load current is below a preselected minimum level;
f. automatically raising the voltage on the rectifier unit indicated in step (d) after step (c) is effectuated if the magnitude of load current is below said preselected minimum level.

12. A method of regulating the magnitude of current supplied to a load from a plurality of parallel-connected, high-current rectifier units, each of said units being connected to a separate electric transformer to supply a portion of the total load current the magnitude of which portion is a function of the voltage applied to that unit, each of said units being operative "in range" when supplying no more than a predetermined rated current and being capable of "overloaded" operation in which condition more than rated current is supplied, comprising the steps of:
a. determining if the magnitude of load current is either above a preselected maximum level or below a preselected minimum level;
b. determining, individually for each rectifier unit, if the unit is operating either "in range" or "overloaded"; and
c. so long as all of said units are operating "in range":
  i. raising the voltage on whichever unit is supplying the smallest fraction of its rated current if the magnitude of load current decreases below said preselected minimum level, or
  ii. lowering the voltage on whichever unit is supplying the largest fraction of its rated current if the magnitude of load current increases above said preselected maximum level; or
d. alternatively, when any unit is operating "overloaded", performing the following steps:
  i. indicating which unit has been operating "overloaded" for the longest immediately preceding period of time, and
  ii. automatically lowering the voltage on that unit whenever an overloaded operation has persisted for a predetermined period of time.

13. The method as specified in claim 12 including the following additional steps:
  iii. indicating the particular unit that has been operating "in range" for the longest immediately preceding period of time, and
  iv. automatically raising the voltage on that particular unit if, after performing the step described in subparagraph (d) (ii), the magnitude of load current drops below said preselected minimum level.

* * * * *